United States Patent
Oh et al.

(10) Patent No.: US 12,276,825 B2
(45) Date of Patent: Apr. 15, 2025

(54) METHOD AND SYSTEM FOR INTEGRATION OF REFRACTIVE OPTICS WITH A DIFFRACTIVE EYEPIECE WAVEGUIDE DISPLAY

(71) Applicant: Magic Leap, Inc., Plantation, FL (US)

(72) Inventors: Chulwoo Oh, Sammamish, WA (US); Ravi Kumar Komanduri, Austin, TX (US); Vikramjit Singh, Pflugerville, TX (US); Shuqiang Yang, Austin, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/513,308

(22) Filed: Nov. 17, 2023

(65) Prior Publication Data
US 2024/0085630 A1     Mar. 14, 2024

Related U.S. Application Data

(62) Division of application No. 17/320,060, filed on May 13, 2021, now Pat. No. 11,994,706.

(60) Provisional application No. 63/025,069, filed on May 14, 2020.

(51) Int. Cl.
| | | |
|---|---|---|
| F21V 8/00 | (2006.01) | |
| G02B 25/00 | (2006.01) | |
| G02B 27/01 | (2006.01) | |
| G02B 6/26 | (2006.01) | |

(52) U.S. Cl.
CPC ......... *G02B 6/0033* (2013.01); *G02B 25/001* (2013.01); *G02B 27/0172* (2013.01); *G02B 6/262* (2013.01)

(58) Field of Classification Search
CPC .. G02B 6/005; G02B 6/0053; G02B 27/0172; G02B 6/262; G02B 25/001
See application file for complete search history.

(56) References Cited

U.S. PATENT DOCUMENTS

| | | |
|---|---|---|
| 5,253,117 A | 10/1993 | Kashima |
| 6,244,727 B1 | 6/2001 | Ryan et al. |
| 10,558,045 B2 | 2/2020 | Hofmann et al. |
| 11,994,706 B2 | 5/2024 | Oh et al. |
| 2006/0192306 A1 | 8/2006 | Giller et al. |

(Continued)

FOREIGN PATENT DOCUMENTS

| | | |
|---|---|---|
| WO | 9323244 A1 | 11/1993 |
| WO | 2019195174 A1 | 10/2019 |
| WO | 2021231789 A1 | 11/2021 |

OTHER PUBLICATIONS

U.S. Appl. No. 17/320,060 "Final Office Action", Jun. 8, 2023, 9 pages.
U.S. Appl. No. 17/320,060 , "Non-Final Office Action", Dec. 8, 2022, 7 pages.
U.S. Appl. No. 17/320,060 , "Non-Final Office Action", Dec. 22, 2023, 8 pages.

(Continued)

*Primary Examiner* — Michael P Mooney
(74) *Attorney, Agent, or Firm* — KILPATRICK TOWNSEND & STOCKTON LLP

(57) ABSTRACT

A method of fabricating an optical element includes providing a substrate, forming a castable material coupled to the substrate, and casting the castable material using a mold. The method also includes curing the castable material and removing the mold. The optical element comprises a planar region and a clear aperture adjacent the planar region and characterized by an optical power.

20 Claims, 16 Drawing Sheets

(56) References Cited

U.S. PATENT DOCUMENTS

| | | | |
|---|---|---|---|
| 2007/0194337 A1* | 8/2007 | Kondo | H01L 25/167 257/E33.059 |
| 2012/0200943 A1* | 8/2012 | Gallagher | G02B 3/0031 359/737 |
| 2014/0071539 A1 | 3/2014 | Gao | |
| 2015/0055084 A1 | 2/2015 | Stevens et al. | |
| 2016/0163753 A1 | 6/2016 | Yu et al. | |
| 2017/0322418 A1 | 11/2017 | Lin et al. | |
| 2019/0129178 A1 | 5/2019 | Patterson et al. | |
| 2019/0293938 A1 | 9/2019 | Le Saux et al. | |
| 2020/0012044 A1 | 1/2020 | Klug et al. | |
| 2020/0408969 A1 | 12/2020 | Yoon et al. | |
| 2021/0096379 A1 | 4/2021 | Peroz et al. | |
| 2021/0132390 A1 | 5/2021 | Lin et al. | |

OTHER PUBLICATIONS

U.S. Appl. No. 17/320,060, "Notice of Allowance", Aug. 22, 2023, 9 pages.

EP21803054.2, "Extended European Search Report", Nov. 2, 2023, 8 pages.

PCT/US2021/032332, "International Preliminary Report on Patentability", Nov. 24, 2022, 8 pages.

PCT/US2021/032332, "International Search Report and Written Opinion", Oct. 14, 2021, 11 pages.

PCT/US2021/032332, "Invitation to Pay Additional Fees and, Where Applicable, Protest Fee", Jul. 28, 2021, 2 pages.

U.S. Appl. No. 17/320,060, "Notice of Allowance", Apr. 2, 2024, 10 pages.

* cited by examiner

METHOD AND SYSTEM FOR INTEGRATION OF REFRACTIVE OPTICS WITH A DIFFRACTIVE EYEPIECE WAVEGUIDE DISPLAY

CROSS-REFERENCES TO RELATED APPLICATIONS

This application is a divisional of U.S. patent application Ser. No. 17/320,060, filed on May 13, 2021, U.S. Pat. No. 11,994,706, issued on May 28, 2024, entitled "METHOD AND SYSTEM FOR INTEGRATION OF REFRACTIVE OPTICS WITH A DIFFRACTIVE EYEPIECE WAVEGUIDE DISPLAY," which is a non-provisional of and claims the benefit of and priority to U.S. Provisional Patent Application No. 63/025,069, filed on May 14, 2020, entitled "METHOD AND SYSTEM FOR INTEGRATION OF REFRACTIVE OPTICS WITH A DIFFRACTIVE EYEPIECE WAVEGUIDE DISPLAY," which are hereby incorporated by reference in their entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems for waveguide displays. More particularly, embodiments of the present invention provide methods and systems that integrate refractive optics with a diffractive eyepiece waveguide display, also referred to as a waveguide display. The invention is applicable to a variety of applications in computer vision and image display systems.

As described herein, embodiments of the present invention relate to methods and systems for fabricating laminated lenses and optical elements having optical power, which can be utilized with diffractive eyepiece waveguides forming part of an augmented reality display device. As described herein, methods of lens integration with a waveguide optical combiner for mixed reality displays are provided. In a particular embodiment, a pair of lenses are utilized to create a virtual image depth plane, while preserving the depth planes of real world objects. The pair of lenses is integrated with waveguide layers to provide very thin and compact wearable form-factors and to improve user experience, including high optical transmission, by reducing the distance between the lenses in the pair of lenses while compensating the lens effect for the world view.

According to an embodiment of the present invention, a method of fabricating an optical element is provided. The method includes providing a substrate, forming a castable material coupled to the substrate, and casting the castable material using a mold. The method also includes curing the castable material and removing the mold.

According to another embodiment of the present invention, a method of fabricating an optical element is provided. The method includes providing a mold set having mold plates and placing a moldable material between the mold plates. The method also includes joining the mold plates, curing the moldable material to form the optical element, and removing the optical element from the mold set.

The optical element can be characterized by a negative optical power or a positive optical power. One of the mold plates can be characterized by a planar surface. The moldable material can be a UV curable resin. Moreover, at least one of the mold plates can include nano-features. In an embodiment, the optical element comprises a planar region and a clear aperture adjacent the planar region and characterized by an optical power. In some embodiments, the mold comprises an anti-stiction coating that can be hydrophobic. As an example, the anti-stiction coating can include silicon oxide or silicon nitride.

According to a specific embodiment of the present invention, an eyepiece waveguide is provided. The eyepiece waveguide includes a set of waveguide layers having a world side and a user side. The eyepiece waveguide also includes a first cover plate having a first optical power and disposed adjacent the world side of the set of waveguide layers and a second cover plate having a second optical power and disposed adjacent the user side of the set of waveguides.

Numerous benefits are achieved by way of the present invention over conventional techniques. For example, embodiments of the present invention provide methods and systems that provide compact eyepiece waveguide systems with integrated laminated lenses or optical elements that function as both a cover plate and a lens. Moreover, because embodiments of the present invention enable the pair of lenses that is integrated with the eyepiece waveguide to be positioned close to each other, optical aberrations are reduced in comparison with conventional techniques. These and other embodiments of the invention, along with many of its advantages and features, are described in more detail in conjunction with the text below and attached figures.

DETAILED DESCRIPTION OF SPECIFIC EMBODIMENTS

The present invention relates generally to methods and systems for waveguide displays. More particularly, embodiments of the present invention provide methods and systems that integrate refractive optics with a diffractive eyepiece waveguide display, also referred to as a waveguide display. The invention is applicable to a variety of applications in computer vision and image display systems.

Figure 1A:
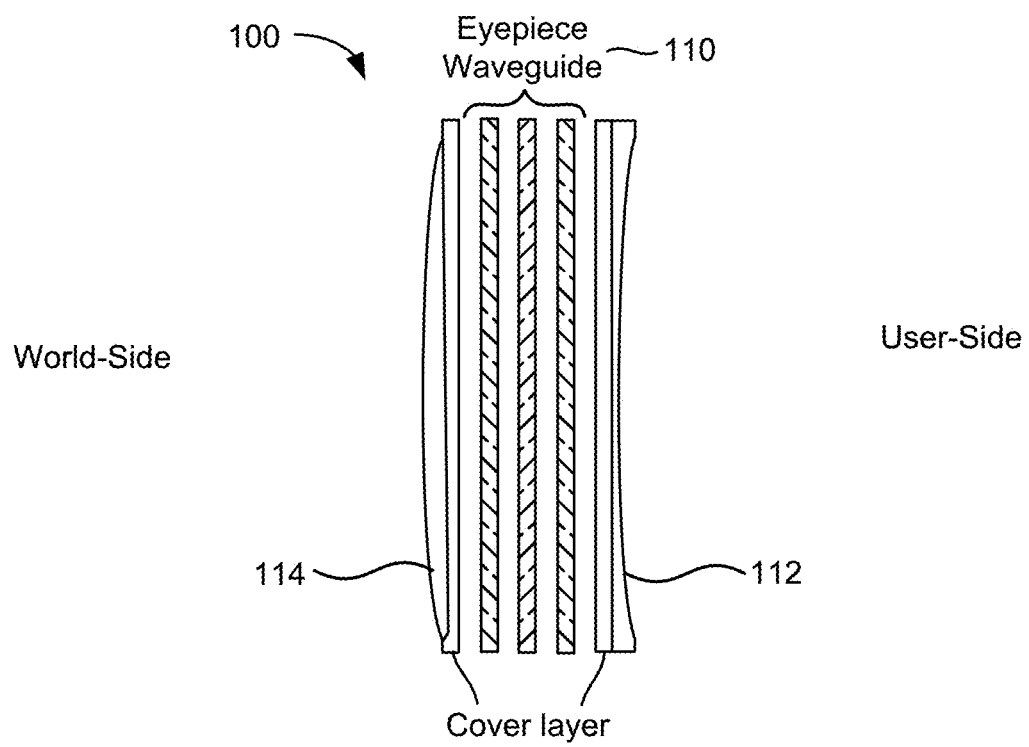
FIG. 1A is a simplified cross-sectional diagram illustrating a viewing optics assembly including an eyepiece waveguide and a laminated lens pair according to an embodiment of the present invention.

FIG. 1A is a simplified cross-sectional diagram illustrating a viewing optics assembly including an eyepiece waveguide and a laminated lens pair according to an embodiment of the present invention. As illustrated in FIG. 1A, viewing optics assembly (VOA) 100 includes an eyepiece waveguide 110, a first laminated lens 112 and a second laminated lens 114. In an embodiment, the eyepiece waveguide is designed to generate virtual images that appear to originate at an infinite distance. In order to enable the user to perceive that the virtual images originate at a non-infinite depth plane, first laminated lens 112, which has a negative optical power, is utilized to diverge light rays generated by eyepiece waveguide 110, resulting in the virtual images generated by eyepiece waveguide 110 appearing to originate from a depth plane a predetermined distance (e.g., 1 meter or 0.3 meters) from the user. In some implementations, first laminated lens 112 is referred to as an inner lens or a user-side lens since it is positioned on the side of the eyepiece waveguide that is facing the user.

In order to enable light incident on VOA 100 from the world side of the VOA to appear at the specific distances associated with the various objects in the world, second laminated lens 114 is utilized to compensate for the optical power of first laminated lens 112. Thus, as illustrated in FIG. 1A, second laminated lens 114 has a positive optical power that is equal and opposite to the negative optical power of first laminated lens 112. In some implementations, second laminated lens 114 is referred to as an outer lens or a world-side lens since it is positioned on the side of the eyepiece waveguide that is facing the world. As will be evident to one of skill in the art, the ability to position first laminated lens 112 and second laminated lens 114 closer together enables improvement in the ability of these lenses to form a compensating pair. By fabricating the lenses as laminated lenses, the spacing between the refractive element and the cover plate is eliminated since the refractive element is formed on the cover plate. Moreover, the thickness of the laminated lens is reduced in comparison to conventional lenses, which is advantageous for AR wearable devices.

Figure 1B:
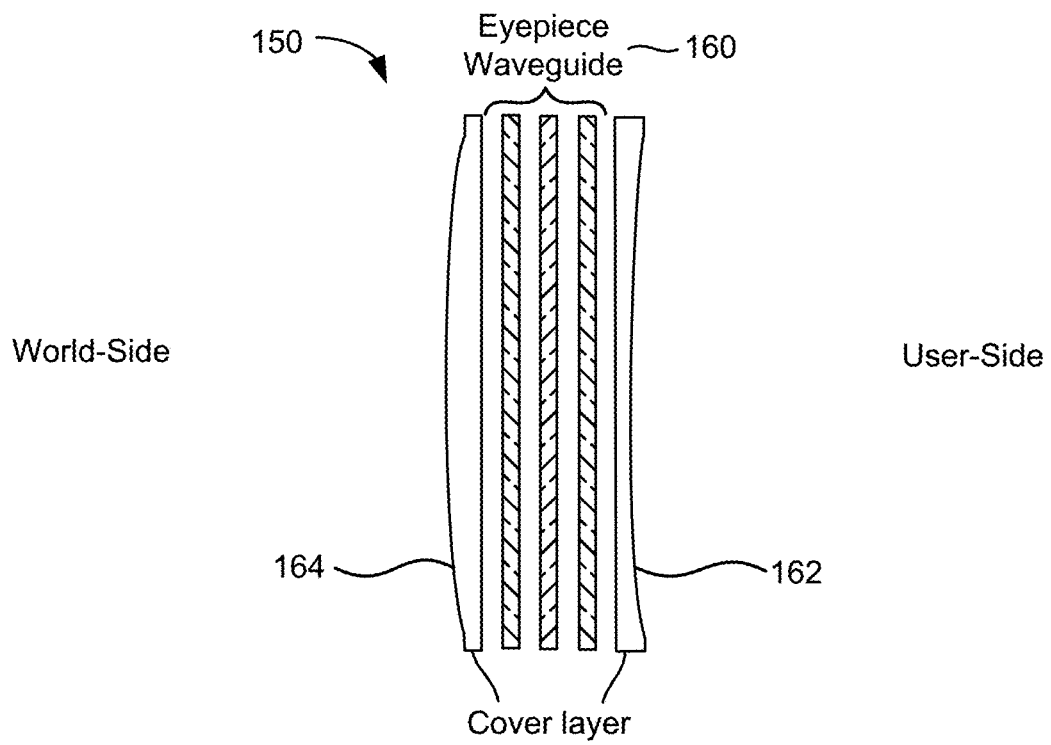
FIG. 1B is a simplified cross-sectional diagram illustrating a viewing optics assembly including an eyepiece waveguide and a set of cover plates with optical power according to an embodiment of the present invention.

FIG. 1B is a simplified cross-sectional diagram illustrating a viewing optics assembly including an eyepiece waveguide and a set of optical elements according to an embodiment of the present invention. As described more fully herein, the optical elements can be referred to as cover plates or cover glass with optical power. These optical elements or cover plates can be fabricated from a variety of materials, including glass or organic materials, for example, a polymer such as, but limited to, polycarbonate, polyethylene terephthalate, cyclo olefin polymers, or the like.

Referring to FIG. 1B, VOA 150 includes an eyepiece waveguide 160, a first optical element 162, and a second optical element 164. Because the optical elements provide both a mechanical function (i.e., protecting the waveguide layers) and an optical function (i.e., focusing or defocusing incident light), the optical elements can be referred to as cover plates with optical power. In an embodiment, the eyepiece waveguide is designed to generate virtual images that appear to originate at an infinite distance. In order to enable the user to perceive that the virtual images originate at a non-infinite depth plane, first optical element 162, which has a negative optical power, is utilized to diverge light rays generated by eyepiece waveguide 160, resulting in the virtual images generated by eyepiece waveguide 160 appearing to originate from a depth plane a predetermined distance (e.g., 1 meter or 0.3 meters) from the user. In some implementations, first optical element 162 is referred to as an inner cover plate or a user-side cover plate since it is positioned on the side of the eyepiece waveguide that is facing the user.

In order to enable light incident on VOA 150 from the world side of the VOA to appear at the specific distances associated with the various objects in the world, second optical element 164 is utilized to compensate for the optical power of first optical element 162. Thus, as illustrated in FIG. 1B, second optical element 164 has a positive optical power that is equal and opposite to the negative optical power of first optical element 162. In some implementations, second optical element 164 is referred to as an outer cover plate or a world-side cover plate since it is positioned on the side of the eyepiece waveguide that is facing the world. As will be evident to one of skill in the art, the ability to position first optical element 162 and second optical element 164 closer together enables improvement in the ability of these cover plates with optical power to form a compensating pair.

In contrast with conventional designs that utilize separate and independent inner and outer lenses, which typically have a minimum thicknesses on the order of ~2 mm-3 mm in order to maintain their mechanical rigidity, thereby resulting in a VOA that is on the order of 7 mm thick, the laminated lenses and cover plates with optical power described herein can have very small thicknesses, for example, on the order of <1 mm, for example, ~600 μm, reducing the thickness of the VOA, in some cases down to <3 mm from 7 mm, thus resulting in a VOA that is lighter and smaller than achievable using conventional approaches. Moreover, because the optical elements are positioned close to each other, as measured along the longitudinal axis orthogonal to the VOA, embodiments of the present invention are characterized by higher optical quality for the user since the compensation provided by the set of lenses or cover plates with optical power is improved with respect to systems using conventional approaches.

Figure 2A:
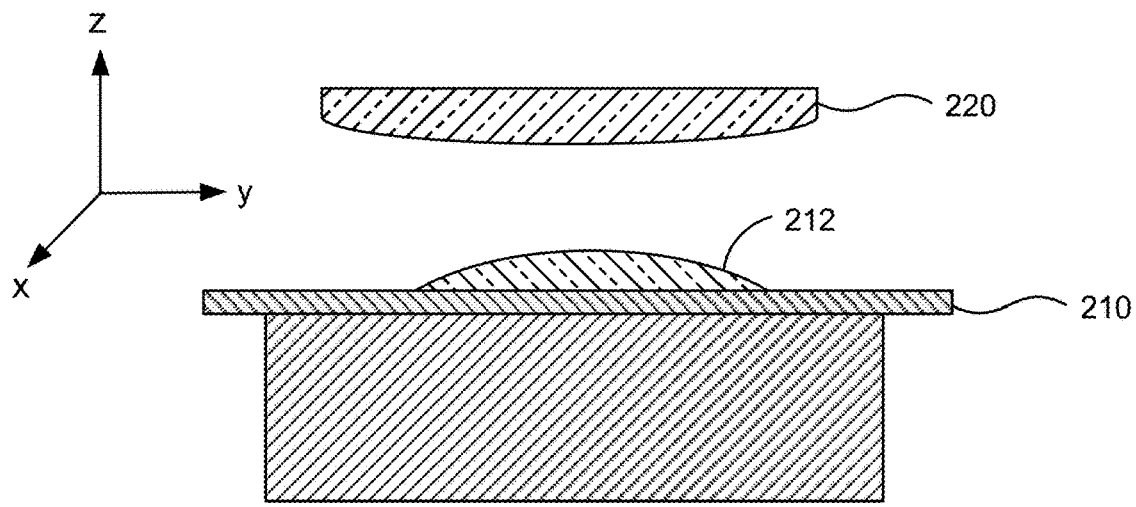
FIGS. 2A-2C are simplified cross-sectional diagrams illustrating a process for fabricating a laminated lens according to an embodiment of the present invention.
Figure 2B:
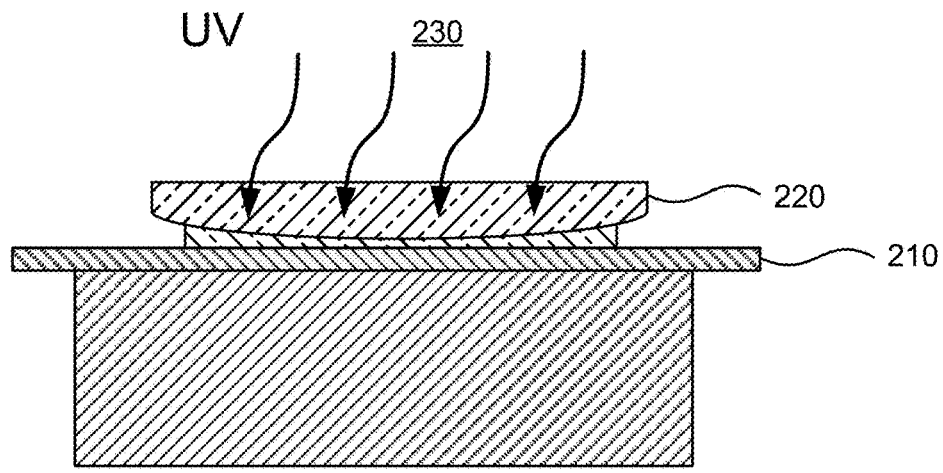
Figure 2C:
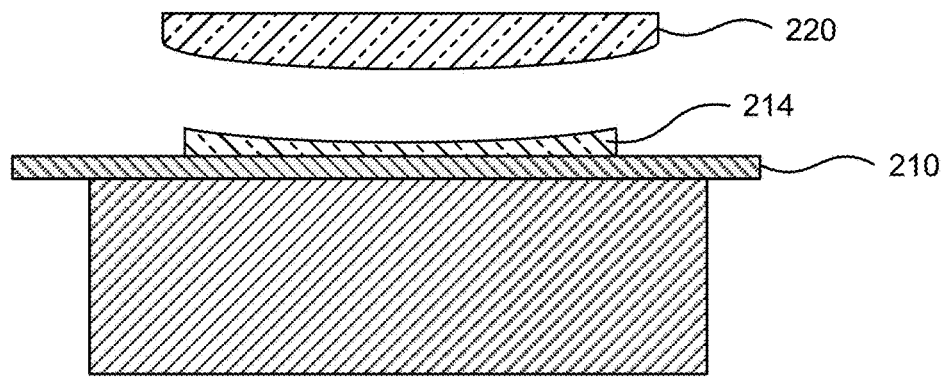

FIGS. 2A-2C are simplified cross-sectional diagrams illustrating a process for fabricating a laminated lens according to an embodiment of the present invention. Referring to FIG. 2A, substrate 210 is provided along with mold 220. In some embodiments, a glass substrate is utilized as substrate 210, but this is not required for the present invention. In other embodiments, other substrates with suitable mechanical rigidity, optical transparency, and the like are utilized as substrate 210, including plastic substrates, polymer substrates, molded photoresist substrates, combinations thereof, or the like. Substrate 210 is a planar substrate, suitable for forming a molded film having at least one planar surface, but, as described in relation to FIG. 2D, curved substrates can be utilized according to some embodiments of the present invention. Substrate 210 can be cleaned with substrate cleaning processes such Acid or Base Piranha, Base or Acid or Neutral Water based Ultrasonication processes, water spin-rinse-dry methods or similar processes. Substrate 210, with a clean surface where a mold replica is to be casted/cured, can be treated with a thin adhesive intermediate cross-linked layer (e.g., less than <10 nm), which can be coated using a coating process such as, but not limited to, vapor treatment, slot-die, spray, spin coating, inkjet, screen coating, etc. Such an adhesive coating enables the molded material to form chemical, h-bonds, or physical bonds with the intermediate adhesion layer, enabling the molded lens to not have break or peel off defects post replication and ensure reliability of the molded part over time and with use of the wearable.

Substrate 210 can also be mechanically constrained to a planar surface on a vacuum chuck, for example, so as to not impart mechanical change in curvature during the lens molding process. As an example, mold 220 can be fabricated to have a predetermined curvature, which can have a bias built in to account, for example, for material volumetric shrinkage of around ~10%, in order to fabricate a molded film having a matching or desired predetermined curvature, that is, a mold with a radius of curvature of R=0.5665 m and a molded film with a radius of curvature of R=−0.515 m. At an index of n=1.53, the molded lens would thus have a focal depth of −1,000 mm. In the embodiment illustrated in FIG. 2A, mold 220 is a convex mold that is used to form a plano-concave molded film, but in other implementations, other curvatures are utilized. Castable material or curable resin 212 is deposited in unreacted or semi-reacted form, for example, dispensed as a liquid of low to high viscosity (10 cP~1000 cP), on substrate 210 or on the mold (as described later). Castable material 212 can be a resin that is cured using ultraviolet (UV) radiation to provide a molded film with a fixed geometry and high optical transparency, i.e., a UV-curable resin, a UV-curable photoresist, or the like. Deposition processes to dispense the castable material or curable resin 212 can include, but are not limited to, microjetting, positive displacement type systems such a syringe pumps, pipetting, or the like.

As illustrated in FIG. 2B, mold 220 is brought into proximity with substrate 210 and castable material 212 is compressed between the mold and the substrate, thereby shaping the surface of the castable material facing the mold to the matching predetermined curvature. In the illustrated example, mold 220 has a convex curvature, thereby producing a concave curvature for the surface of castable material 212 facing mold 220. Because substrate 210 is planar in the embodiment illustrated in FIGS. 2A-2C, the surface of castable material 212 facing substrate 210 is planar. As will be evident to one of skill in the art, the shaping of the castable material is performed in a manner such that the surfaces of the castable material, after curing, have curvatures appropriate to the optical effects (e.g., a predetermined focal length) desired for the laminated lens.

Shaped castable material 212 disposed between mold 220 and substrate 210 is exposed to UV radiation 230 in order to cure the castable material in the shape impressed on the castable material by the mold and substrate. UV curing can be performed, for example, in a time on the scale of tens of seconds, for example, from several minutes to less than one minute, for instance seconds, for a variety of UV-curable materials exposed under different UV-Vis range of wavelengths. Curing lamps can be used, including metal-halide lamps, mercury lamps, or a bank of LEDs having a desirable wavelength spectrum.

FIG. 2C illustrates separation of mold 220 from molded film 214 once the castable material has been cured. Thus, using the process illustrated in FIGS. 2A-2C, a molded film 214 attached to and supported by a substrate 210 is provided. The curvature of molded film 214 can be fabricated as appropriate to the particular application, for example, as an aspheric optical element, although this is not required and spherical surfaces can also be fabricated. Generally, the thickness of molded film 214, measured along the optical axis, also referred to as the longitudinal axis, which is aligned with the z-axis in FIG. 2A, ranges, in this example of a plano-concave lens, from zero or close to zero, for example, on the scale of nanometers to a few microns, at the center of molded film 214 to ~300 μm at the largest lateral extent, measured in the x-y plane. Therefore, utilizing embodiments of the present invention, extremely thin molded films can be produced that are mechanically supported by substrate 210, enabling production of lens structures that are thinner than ones that can be produced using conventional injection molding processes. This should be contrasted with conventional, self-supporting lenses. As an example, if a plano-concave lens were utilized, the thickness of the center of the plano-concave lens, and the mechanical rigidity of the plano-concave lens that results as a function of thickness, will limit the ability to decrease the lens thickness. In contrast, embodiments of the present invention can utilize a thickness of the molded film as low as zero, including thicknesses of several nanometers to several microns, which can be considered as approximately zero, at the center of the molded film since the molded film is supported by the substrate. Accordingly, the thickness of the laminated lens is determined by the thickness of the substrate (e.g., on the order of 1 mm or lower) and the optical power, which impacts the thickness of the molded film at the edges for a plano-concave lens and at the center for a plano-convex lens (e.g., 600 μm).

In contrast with conventional lenses, which are fabricated at dimensions suitable to mechanically support the lens as well as provide optical power, embodiments of the present invention utilize the substrate to provide mechanical rigidity and support while utilizing the molded film to provide optical power. Thus, by separating these two functions into two structures/materials, embodiments of the present invention are able to provide similar mechanical and optical functionality in a package that is a fraction of the dimensions of a conventional lens, particularly the thickness along the optical or longitudinal axis. As an example, using a rigid glass substrate, molded films that are much less rigid and not self-supporting can be formed on the rigid glass substrate, achieving thicknesses for the molded film on the order of 300 μm-600 μm, which would not be possible if a lens were to be fabricated from the material utilized as the molded film.

It should be appreciated that although a single lens is fabricated using the process illustrated in FIGS. 2A-2C, embodiments of the present invention are not limited to the fabrication of a single lens using the methods and systems described herein. Rather, mold 220 can be characterized by a plurality of regions of convex curvature, thereby forming a plurality of lenses concurrently or simultaneously using a multi-lens mold. Thus, illustrations showing the fabrication of a single lens using a single lens mold, for example, in FIGS. 2A-2C, but also in other figures, are merely provided for ease of illustration and are not intended to limit embodiments of the present invention.

The inventors have determined that during curing of the resin material, mechanical and volumetric material shrinkage of the casted material as a lens geometry occurs. However, this mechanical shrinkage is predictable and can be accounted for during the lens design process, eliminating unwanted bow/warp in the substrate (if any), mechanically constraining the substrate to avoid unwanted substrate or mold movement, with the curvature of the mold being modified with respect to the desired curvature of the lens, resulting in the lens being characterized by the desired curvature after molding and mechanical shrinkage have occurred. Moreover, because different castable materials characterized by different indices of refraction can be utilized in conjunction with the processes described herein, a single mold can be utilized to produce laminated lenses with different focal lengths. The inventors have determined that by utilizing castable materials with their indices of refraction varying from about 1.5 to 1.75, focal lengths varying from ~0.85 F to ~1.1 F can be produced, where F is the focal length (e.g., 1/3.5 diopters).

Figure 2D:
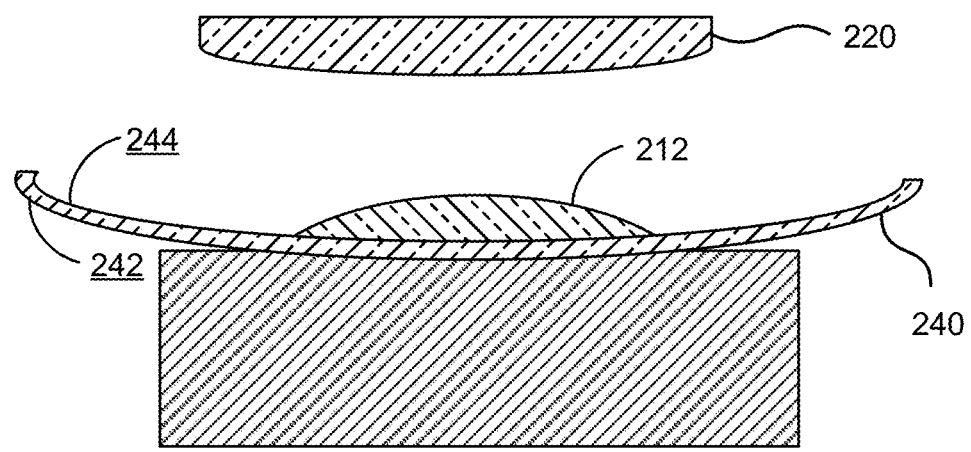
FIG. 2D is a simplified cross-sectional diagram illustrating a process for fabricating a laminated lens according to another embodiment of the present invention.

FIG. 2D is a simplified cross-sectional diagram illustrating a process for fabricating a laminated lens according to another embodiment of the present invention. FIG. 2D shares some similarities to FIG. 2A and the description provided in relation to FIG. 2A is applicable to FIG. 2D as appropriate. As illustrated in FIG. 2D, substrate 240 is characterized by a curved geometry, enabling fabrication of a molded film having two curved surfaces, in this case, a convex lower surface 242 and a concave upper surface 244, thereby forming either a positive or negative lens depending on the curvature of mold 220 and substrate 240.

Referring to FIG. 2D, a process of molding a refractive lens on a flexible plastic substrate (e.g., an organic material composed of say PC, PET, PEN, or the like) is illustrated. Such plastic substrates have an elastic modulus under 10 GPa unlike, for example, thin glass substrates (e.g., soda lime, fused silica, or the like), which have a higher elastic modulus. Plastic substrates can also come in rolls for use in a web or sheet process using such substrates and the plastic substrates can have a pre-defined curvature with uniform thickness for which FIG. 2D is an example cross-section provided for illustrative purposes.

Referring to FIG. 2D, substrate 240 is provided along with mold 220. In some embodiments, a glass substrate is utilized as substrate 240, but this is not required for the present invention. In other embodiments, other substrates with suitable mechanical rigidity, optical transparency, and the like are utilized as substrate 240, including plastic substrates, polymer substrates, molded photoresist substrates, combinations thereof, or the like. As an example, mold 220 can be fabricated to have a predetermined curvature, which can have a bias built in to account, for example, for material volumetric shrinkage of around ~10%, in order to fabricate a molded film having a matching or desired predetermined curvature, that is, a mold with a radius of curvature of R=0.5665 m and a molded film with a radius of curvature of R=−0.515 m. At an index of n=1.53 the molded lens would thus have a focal depth of −1000 mm. In the embodiment illustrated in FIG. 2D, mold 220 is a convex mold that is used to form a concave-convex molded film, but in other implementations, other curvatures are utilized. Castable material or curable resin 212 is deposited in unreacted or semi-reacted form, for example, dispensed as a liquid of low to high viscosity (10 cP~1000 cP), on substrate 210 or on the mold (as described later). Castable material 212 can be a resin that is cured using ultraviolet (UV) radiation to provide a molded film with a fixed geometry and high optical transparency, i.e., a UV-curable resin, a UV-curable photoresist, or the like. Deposition processes to dispense the castable material or curable resin 212 can include, but are not limited to, micro-jetting, positive displacement type systems such a syringe pumps, pipetting, or the like.

As discussed in relation to FIGS. 2B and 2C, mold 220 is brought into proximity with substrate 240 and castable material 212 is compressed between the mold and the substrate, thereby shaping the surface of the castable material facing the mold to the matching predetermined curvature. Shaped castable material 212 disposed between mold 220 and substrate 240 is then exposed to UV radiation in order to cure the castable material in the shape impressed on the castable material by the mold and substrate. UV curing can be performed, for example, in a time on the scale of tens of seconds, for example, from several minutes to less than one minute, for instance 30 seconds, for a variety of UV-curable materials.

After curing, mold 220 is separated from the molded film to produce the laminated lens with a curved substrate.

Figure 3A:
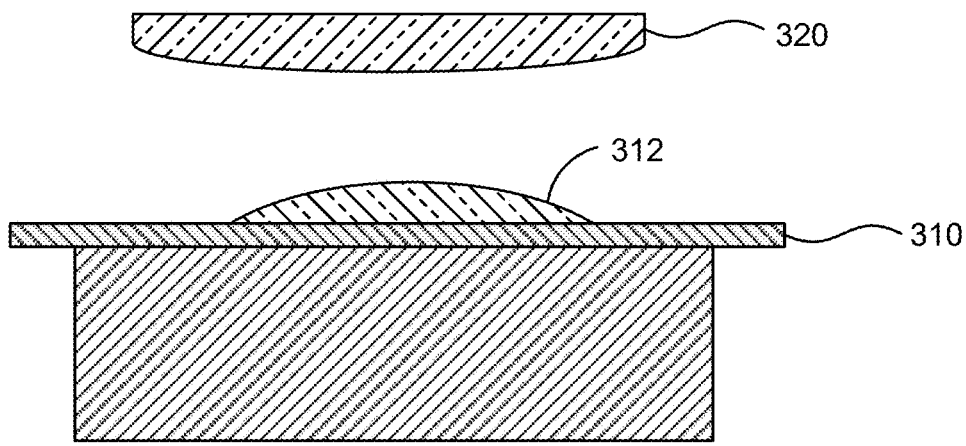
FIGS. 3A-3D are simplified cross-sectional diagrams illustrating a process for fabricating a laminated lens using a master according to an embodiment of the present invention.
Figure 3B:
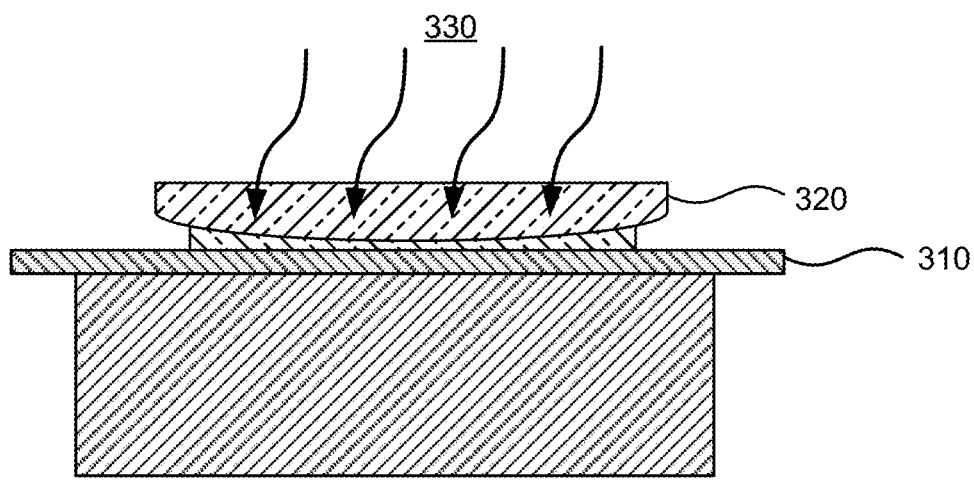
Figure 3C:
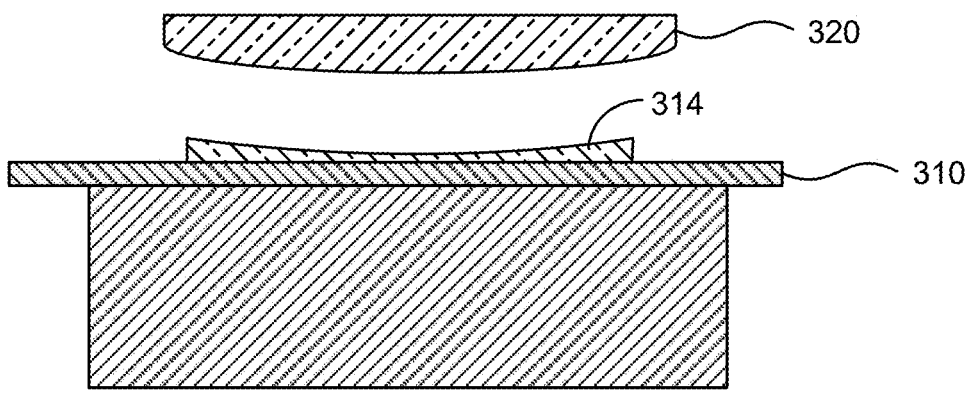
Figure 3D:
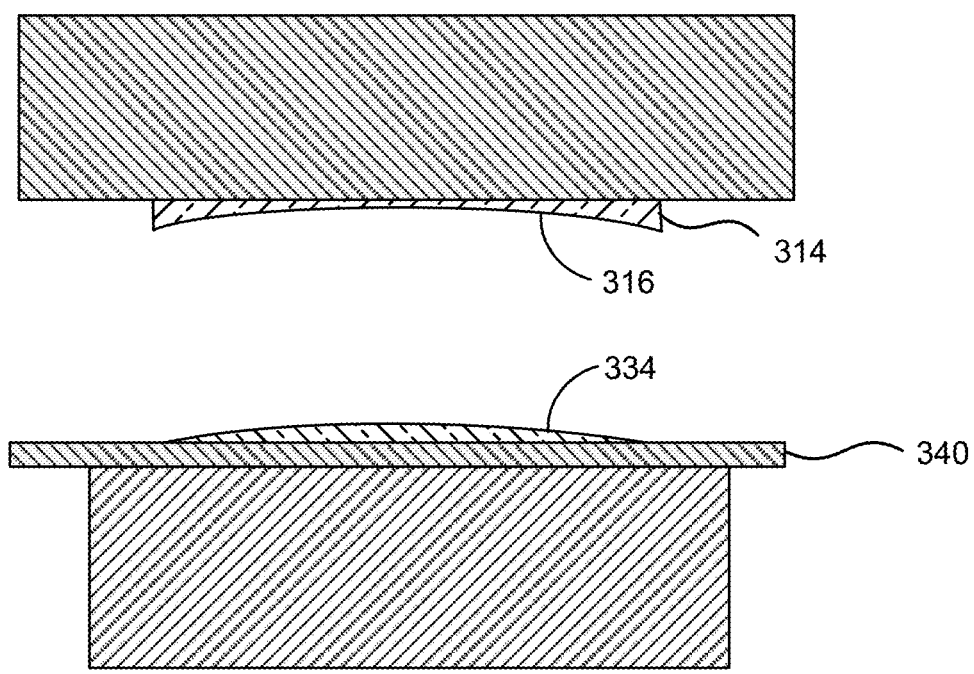

FIGS. 3A-3D are simplified cross-sectional diagrams illustrating a process for fabricating a laminated lens using a master according to an embodiment of the present invention. In this process, an intermediate sub-master of opposite tone to the master mold is created. As described below, substrate 310 with molded film 314, illustrated in FIG. 3C, can be considered an intermediate mold or a sub-master, which is used to create the same lens tone as mold 320, which is used as a master. In other words, starting with mold 320, a process is provided in which castable material 334, illustrated in FIG. 3D, is molded to provide molded films by using a sub-master that is a fraction of the thickness of mold 320. For example, referring to FIG. 3D, molded film 314 and anti-stiction coating 316 can have a combined thickness of less than 1 mm, in comparison to a thickness of mold 320, which typically has a thickness exceeding 2 mm.

Referring to FIG. 3A, substrate 310 is provided along with mold 320. In some embodiments, a glass substrate is utilized as substrate 310, but this is not required for the present invention. In other embodiments, other substrates with suitable mechanical rigidity, optical transparency, and the like are utilized as substrate 310, including plastic substrates, polymer substrates, molded photoresist substrates, combinations thereof, or the like. Substrate 310 is a planar substrate, suitable for forming a molded film having at least one planar surface, but curved substrates can be utilized according to some embodiments of the present invention. Mold 320 is fabricated to have a predetermined curvature in order to fabricate a molded film having a matching predetermined curvature, that is, a mold with a radius of curvature of R=1 m and a molded film with a radius of curvature of R=−1 m. In the embodiment illustrated in FIG. 3A, mold 320 is a convex mold that is used to form a plano-concave molded film, but in other implementations, other curvatures are utilized. Castable material 312 is deposited, for example, dispensed as a liquid, on substrate 310. Castable material 312 can be a resin that is cured using ultraviolet (UV) radiation to provide a molded film with a fixed geometry and high optical transparency, i.e., a UV-curable resin, a UV-curable photoresist, or the like.

As illustrated in FIG. 3B, mold 320 is brought into proximity with substrate 310 and castable material 312 is compressed between the mold and the substrate, thereby shaping the surface of the castable material facing the mold to the matching predetermined curvature. In the illustrated example, mold 320 has a convex curvature, thereby producing a concave curvature for the surface of castable material 312 facing mold 320. Because substrate 310 is planar in the embodiment illustrated in FIGS. 3A-3C, the surface of castable material 312 facing substrate 310 is planar. As will be evident to one of skill in the art, the shaping of the castable material is performed in a manner such that the surfaces of the castable material, after curing, have curvatures appropriate to the optical effects (e.g., a predetermined focal length) desired for the laminated lens.

Shaped castable material 312 disposed between mold 320 and substrate 310 is exposed to UV radiation 330 in order to cure the castable material in the shape impressed on the castable material by the mold and substrate. UV curing can be performed, for example, in a time on the scale of tens of seconds, for example, from several minutes to less than one minute, for instance seconds, for a variety of UV-curable materials.

FIG. 3C illustrates separation of mold 320 from molded film 314 once the castable material has been cured. Thus, using the process illustrated in FIGS. 3A-3C, a molded film attached to and supported by a substrate is provided.

FIG. 3D illustrates molded film 314 after it has been coated with an anti-stiction coating 316, thereby forming a sub-master. As an example, anti-stiction coating 316 can be fabricated using an inorganic layer such as an oxide or a nitride, for example, silicon dioxide or silicon nitride, for instance, deposited using an Atmospheric Pressure Plasma Enhanced Chemical Vapor Deposition (APPECVD) process. Additionally, anti-stiction coating 316 can be fabricated using a metal layer or other organic Fluoropolymer or Silane based polymeric materials that are suitable as a de-molding surface. The inorganic coating material can include, but is not limited to, $SiO_2$, SiC, $Al_2O_3$, $Si_3N_4$, TiN, Cr, Ag, Au, Cu, Ir, Pt, Pd, etc. Semiconductor based processing such as CVD or PVD processes like Plasma enhanced Low pressure CVD, Atomic Layer Deposition, Evaporation, Sputter, etc., can be used to deposit such anti-stiction coatings. Coating methods such as Spraying (atomization), inkjetting, knife edge coating, low pressure or atmospheric vapor coating can be used to coat Fluoropolymer, Siloxane (silicone), or other polymer based coatings. Thus, embodiments of the present invention can utilize a wide variety of anti-stiction materials, also referred to as release layer materials, including inorganic materials, including metals such as Au, Al, or the like, or dielectric materials such as $SiO_2$, $Al_2O_3$, TiN, or the like. Moreover, embodiments of the present invention can utilize chemical treatment processes such as a fluorinated surface release chemical treatment, for example, using trichloro (1H, 1H, 2H, 2H-perfluorooctyl) silane, or the like.

The thickness of anti-stiction coating 316 can be on the order of few nanometers, for example, 1 nm, 2 nm, 3 nm or the like, or it can also be tens of nanometers, for example, 10 nm, nm, 30 nm, or the like, or it can be a few hundred nanometers, for example, 100 nm, 200 nm, 300 nm, or the like, that is thicknesses that are thick enough to prevent pinholes and provide mold release, but thin enough to not impact the radius of curvature of molded film 314.

The coating of molded film 314 using anti-stiction coating 316 provides a master with a predetermined curvature and the ability to be used to mold additional molded films that are made using the same material as molded film 314. As will be evident to one of skill in the art, if molded film 314 was brought into direct contact with castable material 334, assuming they are made from the same material, castable material 334, after UV curing, would be bonded to molded film 314. Therefore, using anti-stiction coating 316 enables molded film 314 to be used as a master during the fabrication of a plurality of molded films (e.g., a molded film made from castable material 334). Moreover, in some embodiments, UV curing may result in shrinkage of the castable material. In this case, the presence of the anti-stiction coating can provide a hydrophobic surface that enables the castable material to flow more readily, improving the results obtained using the UV casting process. Moreover, the use of the anti-stiction material facilitates delamination of the cured molded film from the mold after curing. Although anti-stiction coating 316 is discussed in relation to the fabrication of a master and FIG. 3D, it should be appreciated that anti-stiction coatings can be utilized on the molds described herein, for example, mold 220 illustrated in FIG. 2A and mold 320 illustrated in FIG. 3A. One of ordinary skill in the art would recognize many variations, modifications, and alternatives.

Referring once again to FIG. 3D, molded film 314 and anti-stiction coating 316 forms a concave master that can be used to form plano-convex molded film 334 supported by substrate 340. Accordingly, in this embodiment, a molded film formed using the process illustrated in FIGS. 3A-3C can be coated and then utilized as a master to form additional lenses with complementary curvature.

Figure 4:
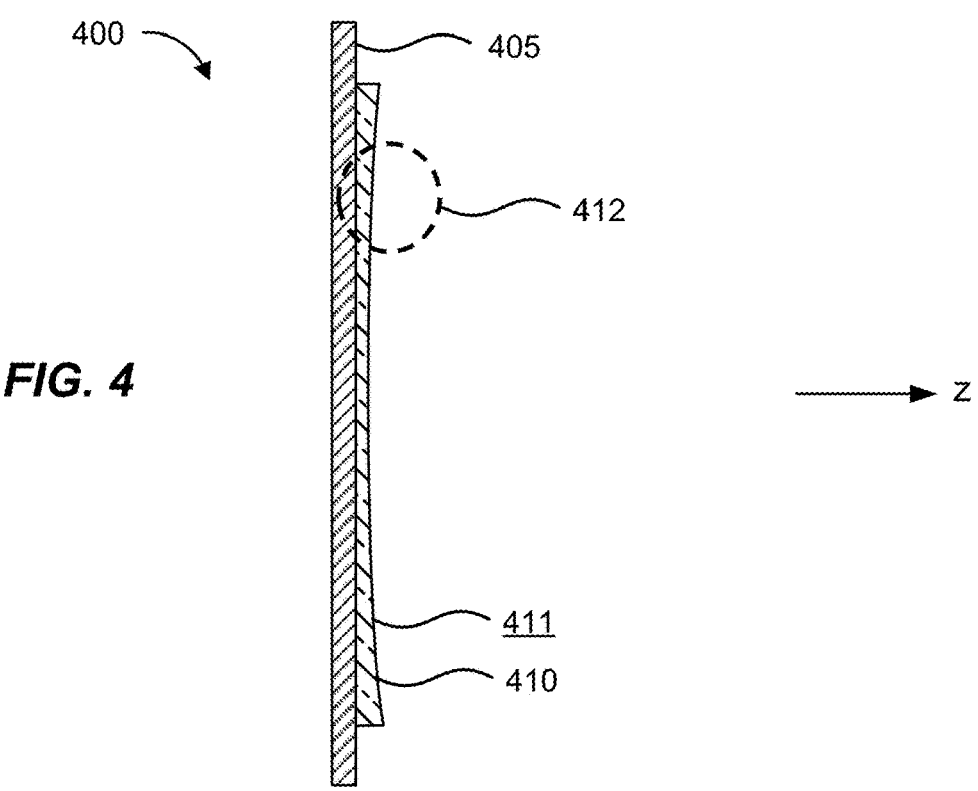
FIG. 4 is a simplified cross-section diagram of a laminated lens according to an embodiment of the present invention.

FIG. 4 is a simplified cross-section diagram of a laminated lens according to an embodiment of the present invention. As illustrated in FIG. 4, laminated lens 400 includes cover plate 405 and molded film 410. In some exemplary embodiments, the thickness of laminated lens 400, measured along the z-axis, is <1 mm, with the thickness of cover plate 405 being ~0.3 μm-0.4 μm and the thickness of molded film 410 being, at the thickest portion of the molded film, on the order of 300 μm-500 μm. As discussed more fully in relation to FIGS. 11A-11C, in addition to refractive properties resulting from the curvature of surface 411, nano-features can be imprinted on surface 411, for example, in region 412.

Figure 5:
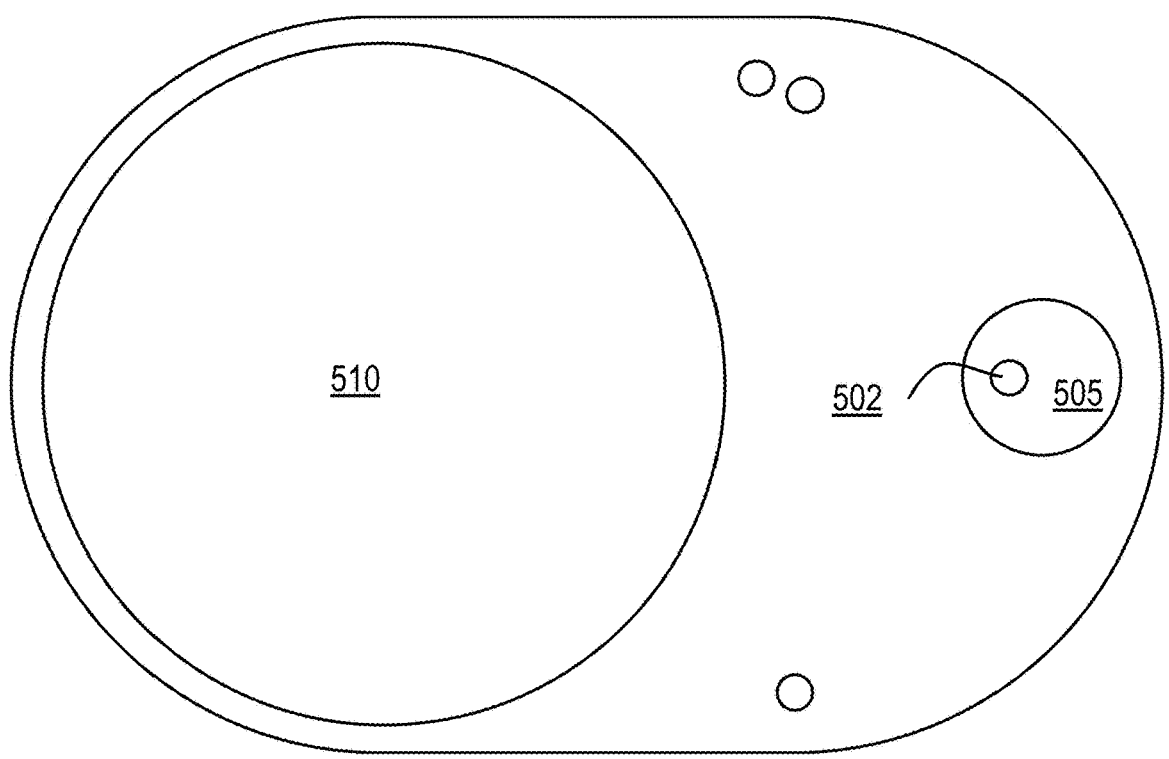
FIG. 5 is a simplified plan view of a laminated lens overlying elements of an eyepiece waveguide according to an embodiment of the present invention.

FIG. 5 is a simplified plan view of a laminated lens overlying elements of an eyepiece waveguide according to an embodiment of the present invention. Referring to FIG. 5, the laminated lens includes region 510, which overlies the combined pupil expander (CPE) (not shown) that implements functions typically performed by an orthogonal pupil expander (OPE) and an exit pupil expander (EPE). Region 510 can be compared to portion 915 in FIG. 9D or portion 1212 or portion 1222 in FIG. 12. The laminated lens may or may not include region 505, which overlies incoupling grating (ICG) 502.

Figure 6A:
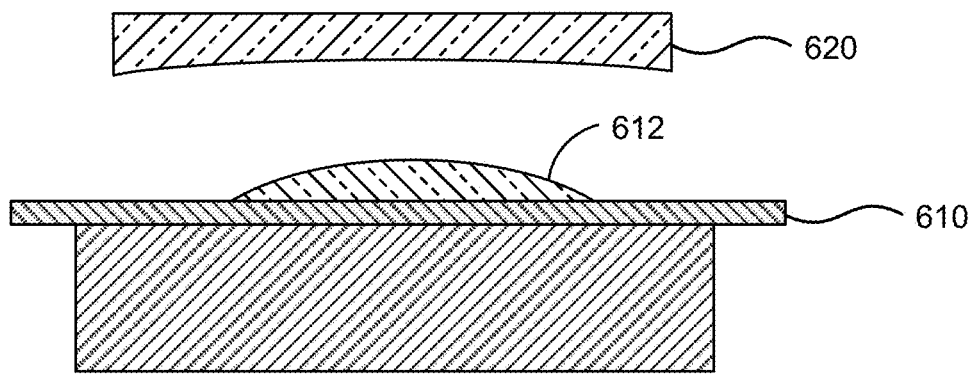
FIG. 6A-6C are simplified cross-sectional diagrams illustrating a process for fabricating a laminated lens with positive optical power according to an embodiment of the present invention.
Figure 6B:
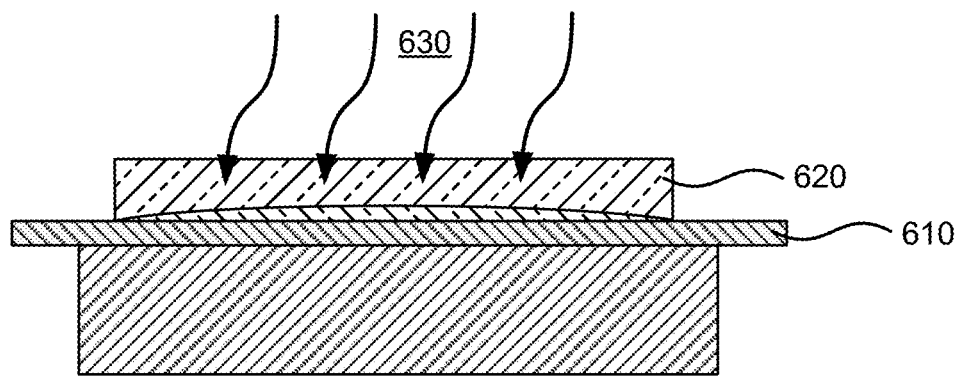
Figure 6C:
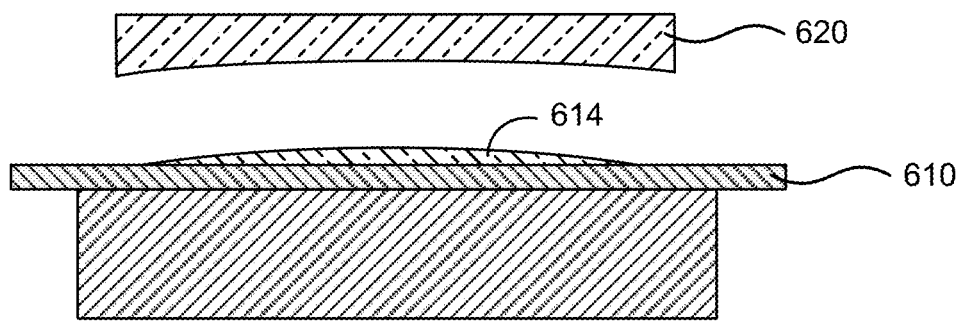

FIG. 6A-6C are simplified cross-sectional diagrams illustrating a process for fabricating a laminated lens with positive optical power according to an embodiment of the present invention. Referring to FIG. 6A, substrate 610 is provided along with mold 620. In some embodiments, a glass substrate is utilized as substrate 610, but this is not required for the present invention. In other embodiments, other substrates with suitable mechanical rigidity, optical transparency, and the like are utilized as substrate 610, including plastic substrates, polymer substrates, molded photoresist substrates, combinations thereof, or the like. Substrate 610 is a planar substrate, suitable for forming a molded film having at least one planar surface, but curved substrates can be utilized according to some embodiments of the present invention. Mold 620 is fabricated to have a predetermined curvature in order to fabricate a molded film having a matching predetermined curvature, that is, a mold with a radius of curvature of R=−1 m and a molded film with a radius of curvature of R=1 m. In the embodiment illustrated in FIG. 6A, mold 620 is a concave mold that is used to form a plano-convex molded film, but in other implementations, other curvatures are utilized. Castable material 612 is deposited, for example, dispensed as a liquid, on substrate 610. Castable material 612 can be a resin that is cured using ultraviolet (UV) radiation to provide a molded film with a fixed geometry and high optical transparency, i.e., a UV-curable resin, a UV-curable photoresist, or the like.

As illustrated in FIG. 6B, mold 620 is brought into proximity with substrate 610 and castable material 612 is compressed between the mold and the substrate, thereby shaping the surface of the castable material facing the mold to the matching predetermined curvature. In the illustrated example, mold 620 has a concave curvature, thereby producing a convex curvature for the surface of castable material 612 facing mold 620. Because substrate 610 is planar in the embodiment illustrated in FIGS. 6A-6C, the surface of castable material 612 facing substrate 610 is planar. As will be evident to one of skill in the art, the shaping of the castable material is performed in a manner such that the surfaces of the castable material, after curing, have curvatures appropriate to the optical effects (e.g., a predetermined focal length) desired for the laminated lens.

Shaped castable material 612 disposed between mold 620 and substrate 610 is exposed to UV radiation 630 in order to cure the castable material in the shape impressed on the castable material by the mold and substrate. UV curing can be performed, for example, in a time on the scale of tens of seconds, for example, from several minutes to less than one minute, for instance seconds, for a variety of UV-curable materials.

FIG. 6C illustrates separation of mold 620 from molded film 214 once the castable material has been cured. Thus, using the process illustrated in FIGS. 6A-6C, a molded film attached to and supported by a substrate is provided. The curvature of molded film 614 can be fabricated as appropriate to the particular application, for example, as an aspheric optical element, although this is not required and spherical surfaces can also be fabricated.

Figure 7A:
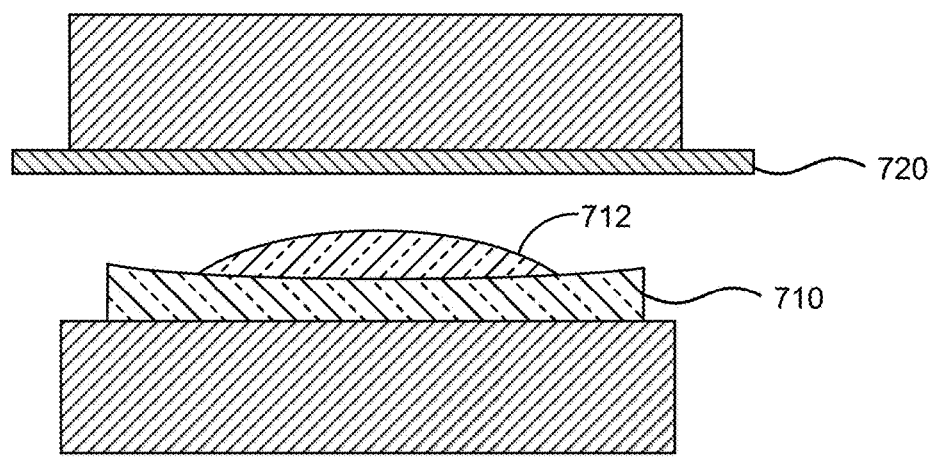
FIG. 7A-7C are simplified cross-sectional diagrams illustrating a process for fabricating a laminated lens with positive optical power according to another embodiment of the present invention.
Figure 7B:
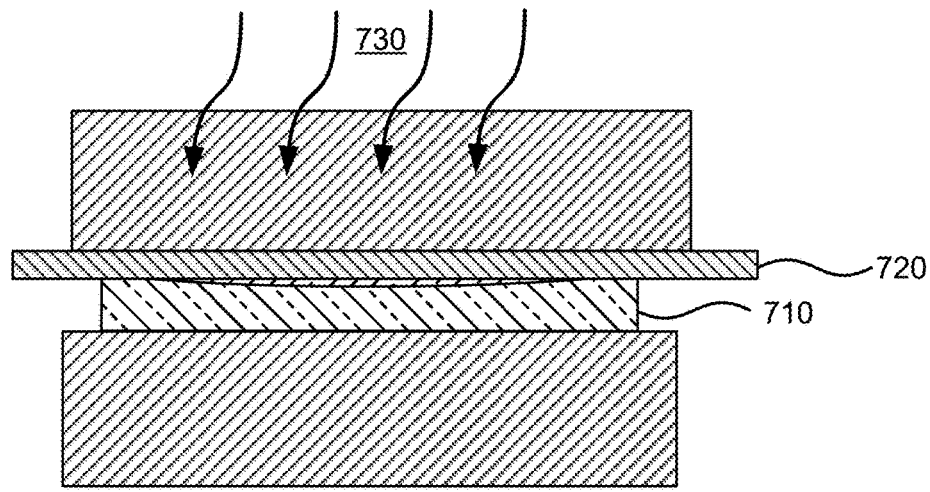
Figure 7C:
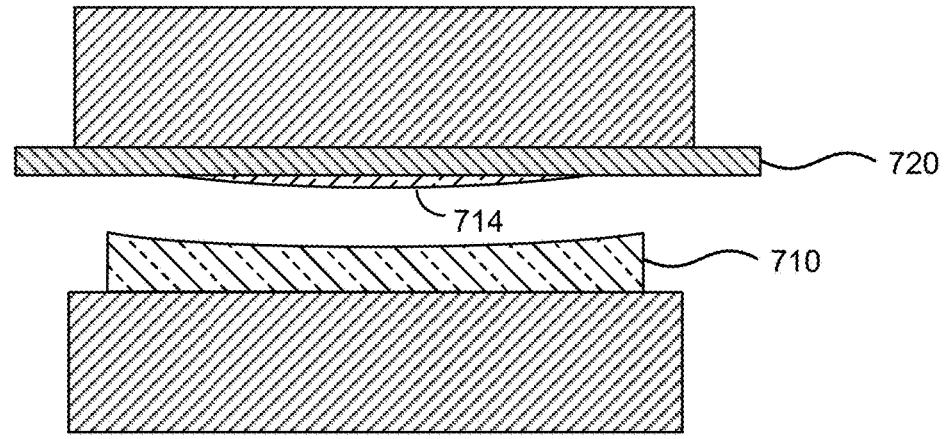

FIG. 7A-7C are simplified cross-sectional diagrams illustrating a process for fabricating a laminated lens with positive optical power according to another embodiment of the present invention. Referring to FIG. 7A, mold 710 is provided along with substrate 720. In some embodiments, a glass substrate is utilized as substrate 720, but this is not required for the present invention. In other embodiments, other substrates with suitable mechanical rigidity, optical transparency, and the like are utilized as substrate 720, including plastic substrates, polymer substrates, molded photoresist substrates, combinations thereof, or the like. Substrate 720 is a planar substrate, suitable for forming a molded film having at least one planar surface, but curved substrates can be utilized according to some embodiments of the present invention.

Mold 710 is fabricated to have a predetermined curvature in order to fabricate a molded film having a matching predetermined curvature, that is, a mold with a radius of curvature of R=−1 m and a molded film with a radius of curvature of R=1 m. In the embodiment illustrated in FIG. 7A, mold 710 is a concave mold that is used to form a plano-convex molded film, but in other implementations, other curvatures are utilized. Castable material 712 is deposited, for example, dispensed as a liquid, on mold 710. Castable material 712 can be a resin that is cured using ultraviolet (UV) radiation to provide a molded film with a fixed geometry and high optical transparency, i.e., a UV-curable resin, a UV-curable photoresist, or the like.

As illustrated in FIG. 7B, substrate 720 is brought into proximity with mold 710 and castable material 712 is compressed between the substrate and the mold, thereby shaping the surface of the castable material facing the substrate to a planar surface with an infinite curvature. In the illustrated example, mold 710 has a concave curvature, thereby producing a concave curvature for the surface of castable material 712 disposed in mold 710. Because substrate 720 is planar in the embodiment illustrated in FIGS. 7A-7C, the surface of castable material 712 facing substrate 710 is planar. As will be evident to one of skill in the art, the shaping of the castable material is performed in a manner such that the surfaces of the castable material, after curing, have curvatures appropriate to the optical effects (e.g., a predetermined focal length) desired for the laminated lens.

Shaped castable material 712 disposed between mold 710 and substrate 720 is exposed to UV radiation 730 in order to cure the castable material in the shape impressed on the castable material by the mold and substrate. UV curing can be performed, for example, in a time on the scale of tens of seconds, for example, from several minutes to less than one minute, for instance seconds, for a variety of UV-curable materials.

FIG. 7C illustrates separation of mold 710 from molded film 714 once the castable material has been cured. Thus, using the process illustrated in FIGS. 7A-7C, a molded film attached to and supported by a substrate is provided.

Figure 8:
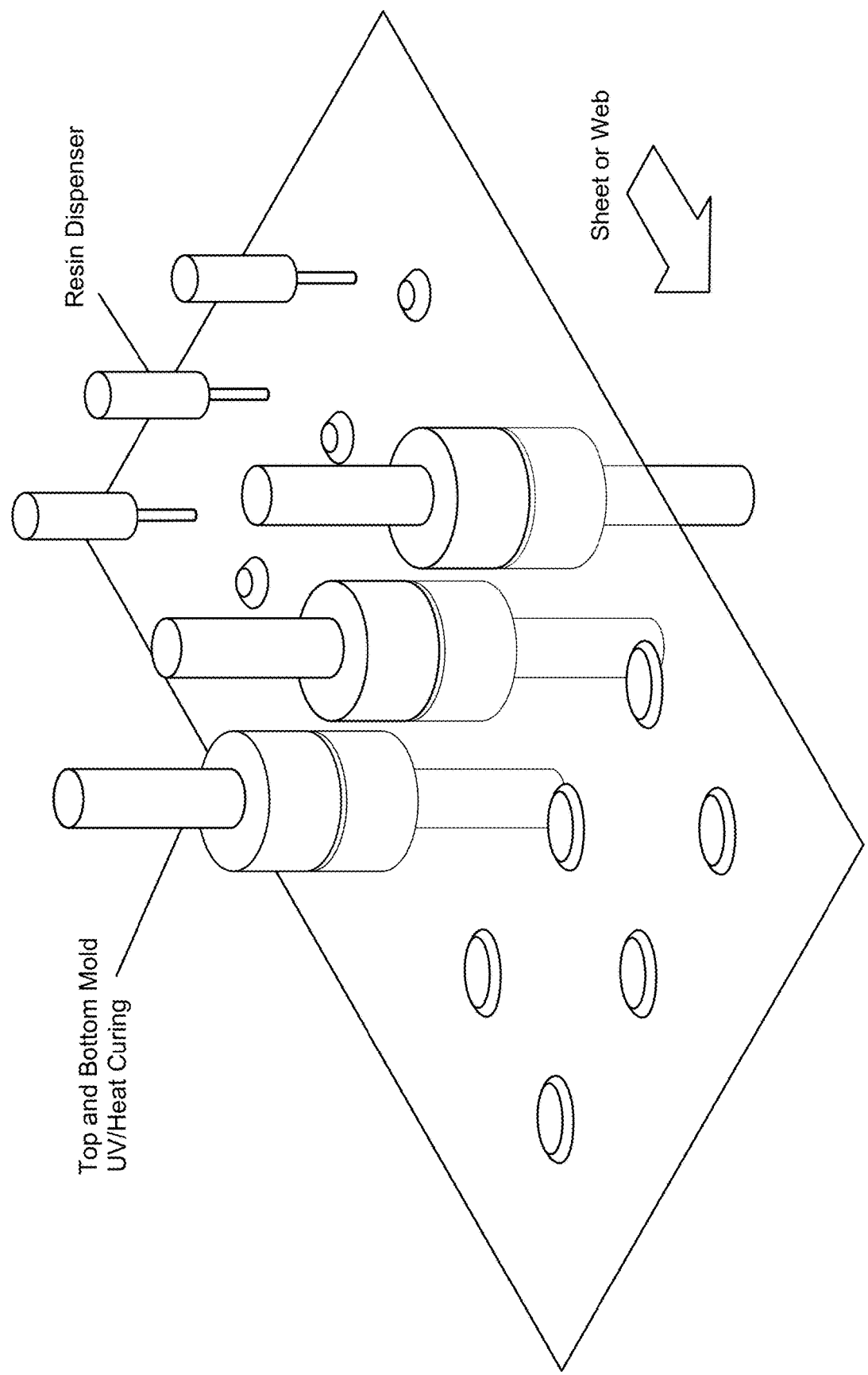
FIG. 8 is a simplified perspective view of a system for forming a plurality of laminated lenses according to an embodiment of the present invention.

FIG. 8 is a simplified perspective view of a system for forming a plurality of laminated lenses according to an embodiment of the present invention. As illustrated in FIG. 8, a sheet or web of cover plate material that will form the cover plate, is fed from right to left. A resin dispenser is positioned in order to dispense the castable material onto the sheet or web. The volume of the dispense, as well as the geometry, can be selected as appropriate to the particular application. Top and bottom molds are utilized in the embodiment illustrated in FIG. 8, although in some embodiments, only a top mold is utilized, with a mechanical support applied to the bottom of the sheet or web. Utilizing UV curing, with optional heating, the castable material is formed into a mold film having the desired shape. After UV curing, the mold films can be separated from the sheet or web for assembly into a VOA.

Figure 9A:
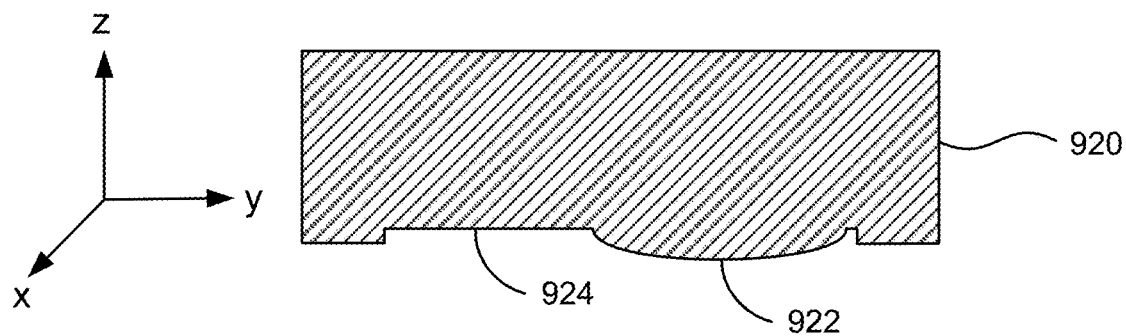
FIGS. 9A-9D are simplified cross-sectional diagrams illustrating a process for fabricating an optical element according to an embodiment of the present invention.
Figure 9A:
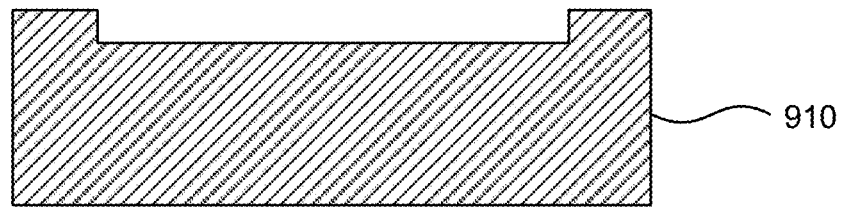

FIGS. 9A-9D are simplified cross-sectional diagrams illustrating a process for fabricating an optical element according to an embodiment of the present invention. In the embodiment illustrated in FIGS. 9A-9D, rather than molding/casting a film deposited on a substrate, the cover glass utilized with the eyepiece waveguide is fabricated to include optical power. Referring to FIG. 9A, first mold 910 and second mold 920 are illustrated. In the embodiment illustrated in FIG. 9A, first mold 910 is fabricated to provide a planar molding surface and second mold 920 is fabricated to have a predetermined curvature over a first portion of the molding surface and a planar molding surface over a second portion of the molding surface. Thus, second mold 920 includes first portion 922 that has a finite curvature, for example, an aspheric curvature, and second portion 924 that is planar.

Figure 9B:
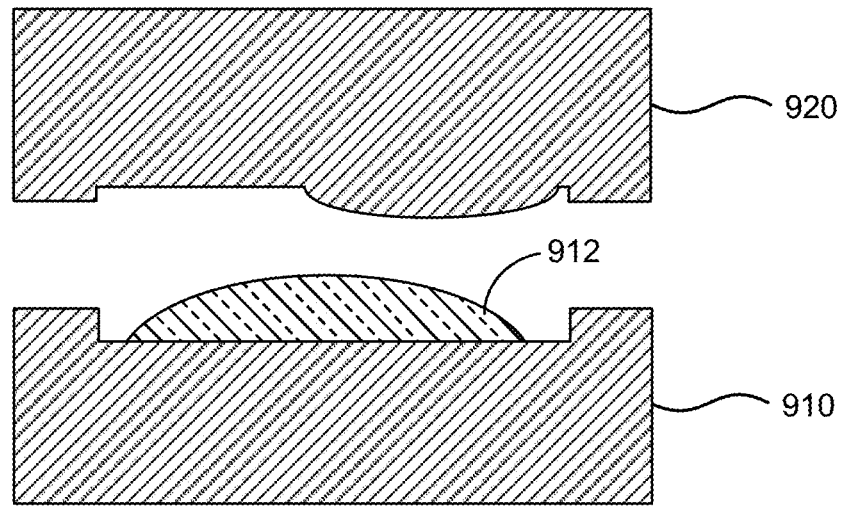

As shown in FIG. 9B, castable material 912 is deposited, for example, dispensed as a liquid, on mold 910. Castable material 912 can be a resin that is cured using UV radiation, i.e., a UV-curable resin, or the like.

Figure 9C:
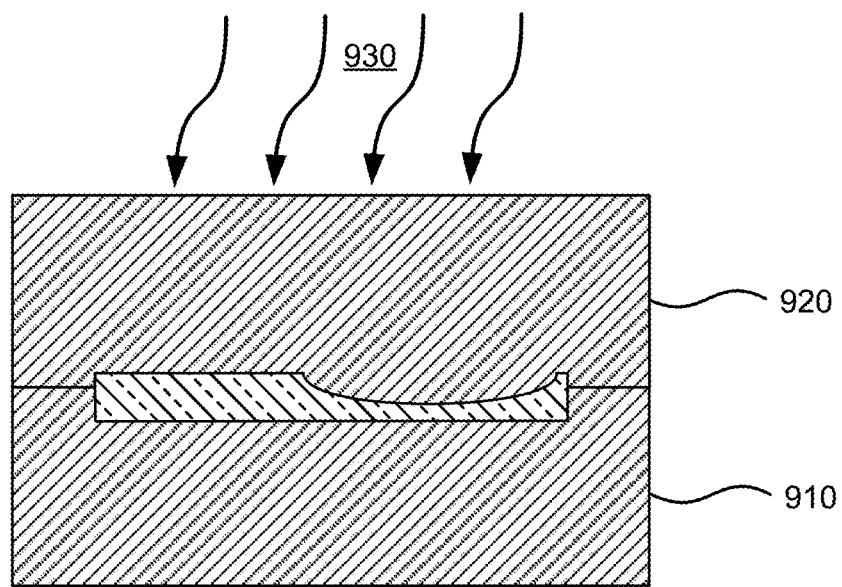

As illustrated in FIG. 9C, first mold 910 is brought into proximity with second mold 920 and castable material 912 is compressed between the first mold and the second mold, thereby shaping the surface of the castable material facing the molds to the matching predetermined surface curvatures and planar features as appropriate. In the illustrated example, first portion 922 of second mold 920 has a convex curvature, thereby producing a concave curvature for the surface of castable material 912 facing first portion 922 of second mold 920. Because first mold 910 and second portion 924 of second mold 920 is planar in the embodiment illustrated in FIGS. 9A-9D, the surface of castable material 912 facing first mold 910 and second portion 924 of second mold 920 is planar. As will be evident to one of skill in the art, the shaping of the castable material is performed in a manner such that the surfaces of the castable material, after curing, have curvatures appropriate to the optical effects (e.g., a predetermined focal length or planarity) desired for the optical element.

Shaped castable material 912 disposed between first mold 910 and second mold 920 is exposed to UV radiation 930 in order to cure the castable material in the shape impressed on the castable material by the molds. UV curing can be performed, for example, in a time of about 30 seconds for a variety of UV-curable materials.

Figure 9D:
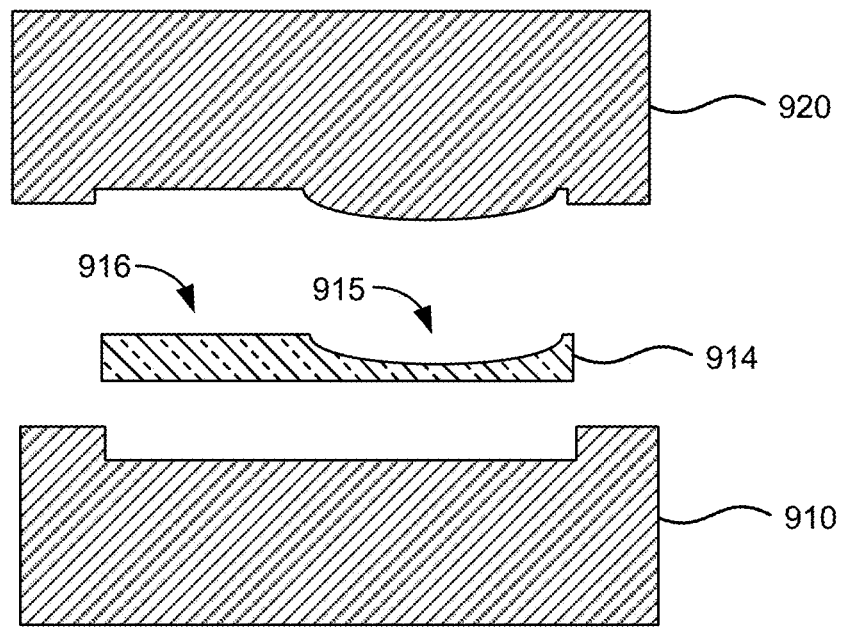
Figure 12:
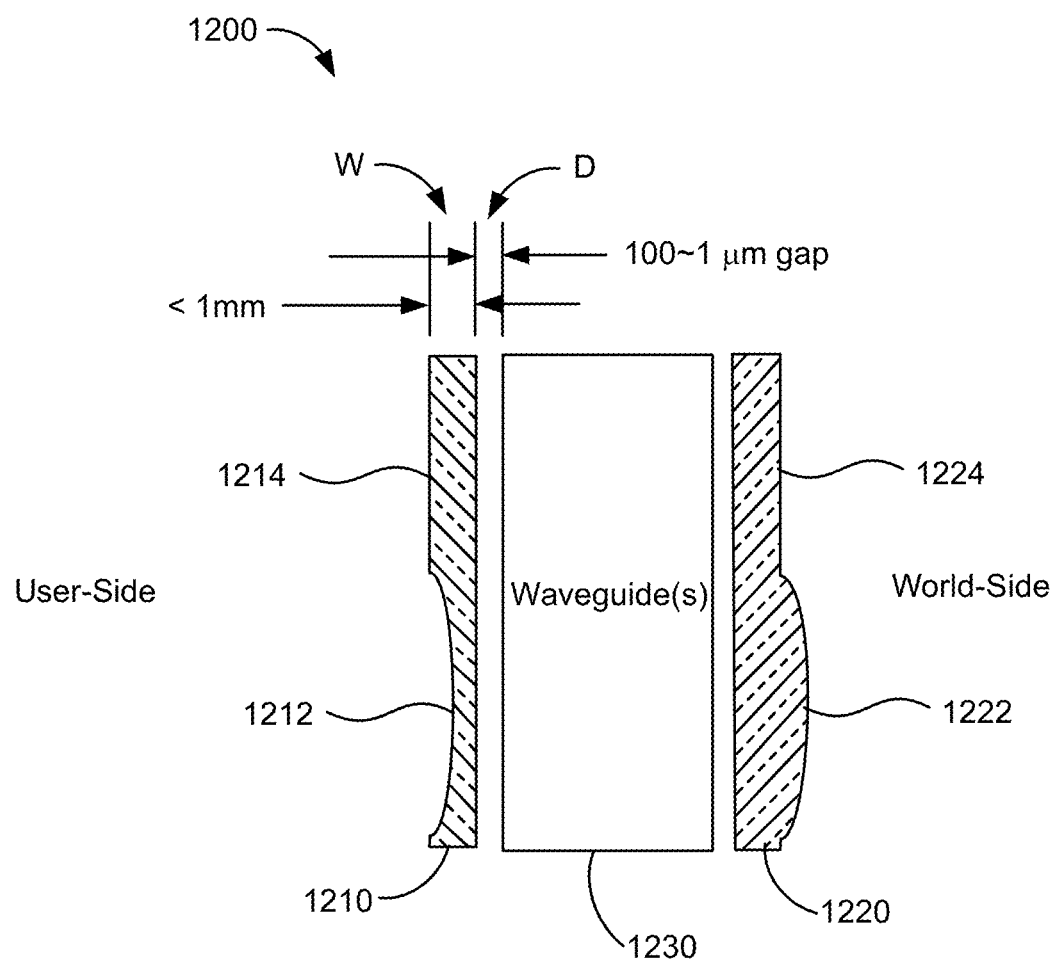
FIG. 12 is a simplified cross-sectional diagram illustrating a VOA including an eyepiece waveguide and a set of optical elements according to an embodiment of the present invention.

As illustrated in FIG. 9D, separation of first mold 910 from second mold 920, once the castable material has been cured results in release of optical element 914 from the molds. Thus, using the process illustrated in FIGS. 9A-9D, an optical element having both planar and curved surfaces is produced. In some embodiments, planar region 916 is utilized to provide a mechanical attachment region so that optical element 914 can be mechanically joined to an eyepiece waveguide as illustrated in FIG. 12. Curved region 915 is utilized to provide refractive effects as described herein. Referring to FIG. 5, in some implementations, planar region 916, with no optical power, can be positioned such that light incident on ICG 502 is not focused as it passes through optical element 914. Thus, in addition to use in mechanical attachment, planar region 916 can be utilized to achieve optical effects as well.

Optical element 914 also includes curved region 915, which can be utilized to diverge light rays, in the plano-concave design illustrated in FIG. 9D, in order to create a virtual depth plane at a predetermined distance from the user as discussed in relation to FIG. 1B. Thus, the curvature of curved region 915 can be fabricated as appropriate to the particular application, for example, as an aspheric optical element, although this is not required and spherical surfaces can also be fabricated. Generally, the thickness of optical element 914, measured along the optical axis, which is aligned with the z-axis in FIG. 9A, ranges, in this example of a plano-concave curved region 915, from several microns over a base thickness of 300 µm at the center of curved region 915 to ~300 µm at the largest lateral extent which is ~600 µm including the base thickness, measured in the x-y plane.

As an example, some eyepiece waveguides include waveguide layers that are fabricated using polymer materials. This type of eyepiece waveguide is suitable for use with cover layers fabricated using polymer materials and directly molded/casted to form an optical element that can provide both cover layer and lens functions. Accordingly, utilizing both polymer eyepiece waveguides and polymer optical elements, a compact and mechanically rigid sandwich structure (e.g., with consistent thermal properties) can be fabricated, with the waveguide layers providing mechanical support for the optical elements, which may not be mechanically strong enough to support themselves independent of the waveguide layers. The gap between the surfaces of the eyepiece waveguide facing the optical elements and the optical elements can be on the order of 100 µm or less.

Moreover, because different castable materials characterized by different indices of refraction can be utilized in conjunction with the processes described herein, a single mold can be utilized to produce laminated lenses with different focal lengths. The inventors have determined that by utilizing castable materials with their indices of refraction varying from about 1.5 to 1.75, focal lengths varying from a focal length of +/−1 m to 0.690 m can be produced for an example radius of curvature of 0.515 m.

Figure 10:
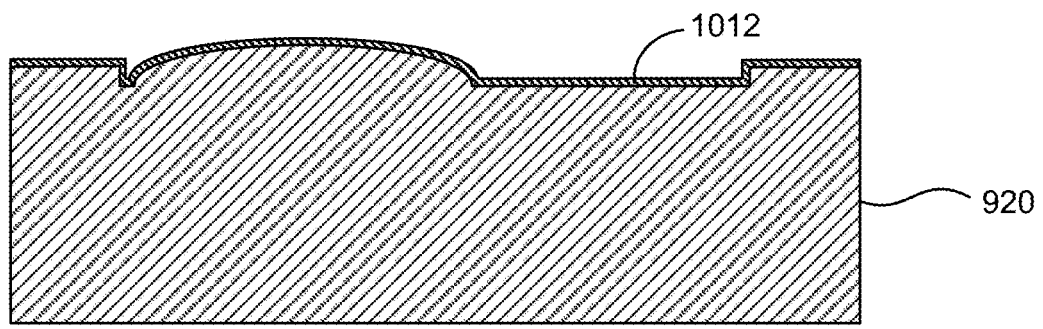
FIG. 10 is a simplified cross-sectional diagram illustrating a mold with an anti-stiction coating according to an embodiment of the present invention.

FIG. 10 is a simplified cross-sectional diagram illustrating a mold with an anti-stiction coating according to an embodiment of the present invention. As illustrated in FIG. 10, mold 920, in an inverted position, has been coated with an anti-stiction coating 1012. As discussed in relation to FIG. 3D, a variety of materials can be utilized, either alone, or in combination, to form anti-stiction coating 1012. For example, anti-stiction coating 1012 can include $SiO_2$, $Si_3N_4$, TiN, $Al_2O_3$, Al, Ag, Ni, combinations thereof, or Fluoro-based or Siloxane-based polymers can be used, or the like. As will be evident to one of skill in the art, the anti-stiction coating illustrated in FIG. 10 is also suitable for use as anti-stiction coating 316 in FIG. 3D.

In some embodiments, nano-features, including those formed using nanometer scale imprinting techniques, can be formed on the surfaces of the laminated lenses or optical elements described herein to provide additional optical functionality (i.e., diffractive optical effects) in addition to the refractive properties associated with curvature of the material surfaces. As an example, in addition to refraction associated with a plano-concave or plan-convex lens profile, an anti-reflection effect can be produced using nano-features formed on the material surfaces. In addition to anti-reflection effects, other diffractive optical effects can be achieved. One of ordinary skill in the art would recognize many variations, modifications, and alternatives.

Figure 11A:
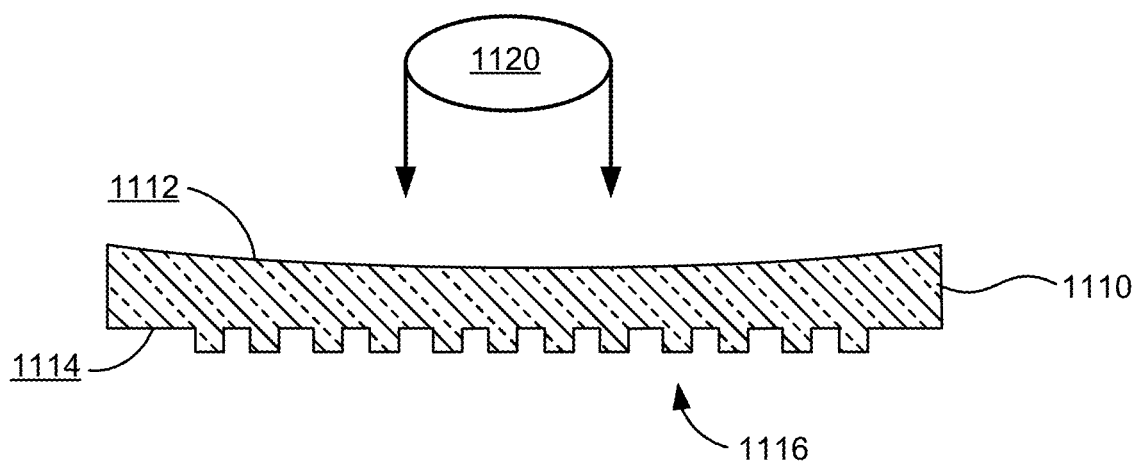
FIG. 11A is a simplified cross-sectional diagram illustrating an optical element with nano-features fabricated on a planar side of the optical element according to an embodiment of the present invention.

FIG. 11A is a simplified cross-sectional diagram illustrating an optical element with nano-features fabricated on a planar surface of the optical element according to an embodiment of the present invention. As illustrated in FIG. 11A, nano-features 1116, for example, a diffraction grating, a metasurface, or the like can be formed on planar surface 1114 of optical element 1110. Thus, as light is incident on optical element 1110 as illustrated by light beam 1120, the light is defocused (i.e., a refractive effect) as it passes through concave surface 1112 and experiences a reduction in reflection at planar surface 1114 (i.e., an anti-reflection effect produced by diffraction effects) produced by the presence of nano-features 1116. Thus, in addition to refractive focusing as a result of the curvature characterizing concave surface 1112, the light experiences diffractive effects as is passes through planar surface 1114 that includes nano-features 1116.

The nano-features can be birefringent or non-birefringent depending on the particular design of the nano-features that is utilized. As an example, nano-structures that are non-birefringent and provide a reduction in reflection at the lens interface can be fabricated using pillars that are disposed at a pitch of 100 nm-140 nm and on the order of 100 nm in height. Alternatively, holes can be formed in the optical element with similar pitch and depth.

Referring once again to FIGS. 9A-9D, embodiments of the present invention utilize molds that include both surface curvature and nano-patterning to form curved surfaces as illustrated by curved region 915 of optical element 914 (corresponding to concave surface 1112 in FIG. 11A) as well as nano-features as illustrated by nano-features 1116 in FIG. 11A), respectively. Accordingly, although first portion 922 of second mold 920 illustrated in FIG. 9A is only illustrated as having a convex curvature, it will be appreciated that first portion 922 could also include nano-patterning that would be able to form the nano-features illustrated, for example, in FIGS. 11A-11C. Thus, in the single fabrication process illustrated in FIGS. 9A-9D, optical elements that produce both refractive and diffractive optical effects can be fabricated in a single process flow. This can also be applied to the curvature surface molded on to a substrate (e.g., glass or plastic) as shown in FIGS. 2C, 3C, 3D, 4, 6C, 7C, 13A, 13B, 13C, 13D, 14A, 14B, 14D, 14E, and 14F. As an example, a cover plate with both optical power and anti-reflection properties can be fabricated in a single process flow without the need for subsequent coating to achieve the anti-reflection properties.

Figure 11B:
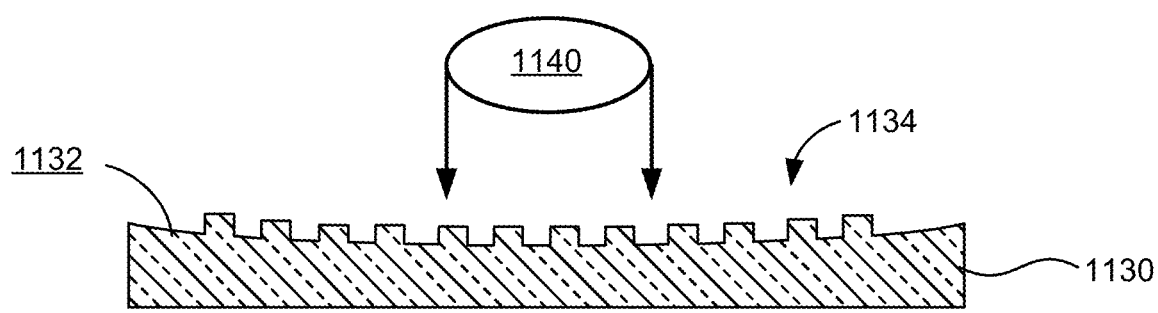
FIG. 11B is a simplified cross-sectional diagram illustrating an optical element with nano-features fabricated on a curved side of the optical element according to an embodiment of the present invention.

FIG. 11B is a simplified cross-sectional diagram illustrating an optical element with nano-features fabricated on a curved surface of the optical element according to an embodiment of the present invention. In addition to the formation of nano-features on planar surfaces, nano-features can be formed on curved surfaces according to embodiments of the present invention. As illustrated in FIG. 11B, nano-features 1134, for example, a metasurface, can be formed on the curved surface of the optical element. Thus, as light is incident on optical element 1130 as illustrated by light beam 1140, the light is both defocused (i.e., a refractive effect) as it passes through concave surface 1132 and experiences a reduction in reflection at concave surface 1132 (i.e., an anti-reflection effect produced by diffraction effects) produced by the presence of nano-features 1134. Thus, both refractive and diffractive effects can be achieved by formation of nano-features on one surface of optical element 1130.

Figure 11C:
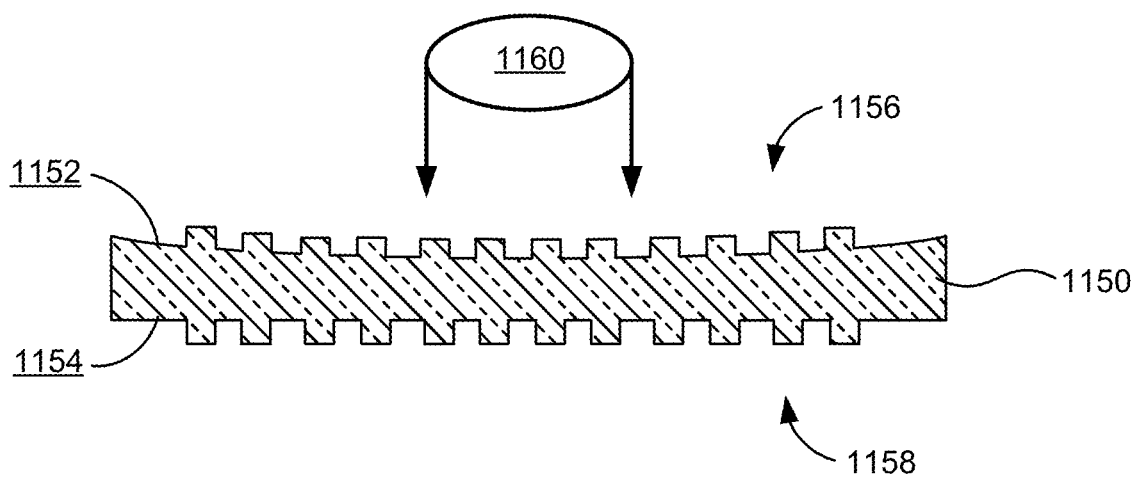
FIG. 11C is a simplified cross-sectional diagram illustrating an optical element with nano-features fabricated on both the planar side and the curved side of the optical element according to an embodiment of the present invention.

FIG. 11C is a simplified cross-sectional diagram illustrating an optical element with nano-features fabricated on both the planar surface and the curved surface of the optical element according to an embodiment of the present invention. As an extension of the designs illustrated in FIGS. 11A and 11B, nano-features 1156 and 1158, for example, meta-surfaces, can be formed on both the curved surface of the optical element as well as the planar surface. Thus, as light is incident on optical element 1150 as illustrated by light beam 1160, the light is both defocused (i.e., a refractive effect) as it passes through concave surface 1152 and experiences a reduction in reflection at concave surface 1152 (i.e., an anti-reflection effect produced by diffraction effects) produced by the presence of nano-features 1156. Moreover, the light can experience the same or an additional diffractive effect, for example, an additional reduction in reflection as a result of nano-features 1158 fabricated on planar surface 1154 of optical element 1150.

FIG. 12 is a simplified cross-sectional diagram illustrating a VOA including an eyepiece waveguide and a set of optical elements according to an embodiment of the present invention. In FIG. 12, VOA 1200 includes eyepiece waveguide 1230 and a pair of optical elements, world-side optical element 1220 and user-side optical element 1210. As described in relation to FIG. 1B, because the optical elements provide both a mechanical function (i.e., protecting the waveguide layers) and an optical function (i.e., focusing or defocusing incident light), the optical elements can be referred to as cover plates with optical power.

As discussed in relation to FIG. 1B, eyepiece waveguide 1200 can be designed to generate virtual images that appear to originate at an infinite distance. In order to enable the user to perceive that the virtual images originate in a non-infinite depth plane, first optical element 1210, which has a negative optical power in portion 1212, is utilized to diverge light rays generated by eyepiece waveguide 1230, resulting in the virtual images generated by eyepiece waveguide 1230 appearing to originate from a depth plane a predetermined distance (e.g., 1 meter or 0.3 meters) from the user. In some implementations, first optical element 1210 is referred to as an inner cover plate or a user-side cover plate since it is positioned on the side of the eyepiece waveguide that is facing the user. In addition to portion 1212 having negative optical power, first optical element 1210 also includes planar portion 1214. In typical implementations, portion 1214 will be outside the user's viewing area and although the lateral dimensions of portions 1212 and 1214 are illustrated as similar in FIG. 12, this is not required by the present invention and portion 1214 can have a lateral size a fraction of the lateral size of portion 1212. Thus, portion 1214 is provided to enable mechanical mounting of first optical element 1210 to eyepiece waveguide 1230 without impacting the clear field associated with the user's viewing area. Additionally, depending on the optical design of the eyepiece waveguide, the ICGs may be positioned on eyepiece waveguide 1230 to overlap laterally with portion 1214, enabling light incident on the ICG from a projector to not be focused by the curved surface in portion 1212. Thus, referring to FIG. 5, portion 1214 can overlap laterally with the ICG 502 of eyepiece waveguide 1230 and portion 1212 can overlap laterally with the CPE of eyepiece waveguide 1230. Although portion 1214 is illustrated as planar in this design, this is not required by the present invention and portion 1214 may include indentions and/or protrusions used for mechanical alignment, or the like. One of ordinary skill in the art would recognize many variations, modifications, and alternatives.

In order to enable light incident on VOA 1200 from the world side of the VOA to appear at the specific distances associated with the various objects in the world, second optical element 1220 is utilized to compensate for the optical power of first optical element 1210. Thus, as illustrated in FIG. 12, second optical element 1220 has a positive optical power that is equal and opposite to the negative optical power of first optical element 1210. In some implementations, second optical element 1220 is referred to as an outer cover plate or a world-side cover plate since it is positioned on the side of the eyepiece waveguide that is facing the world. As will be evident to one of skill in the art, the ability to position first optical element 1210 and second optical element 1220 closer together enables improvement in the ability of these cover plates with optical power to form a compensating pair.

In addition to portion 1222 having positive optical power, second optical element 1220 also includes planar portion 1224. In typical implementations, portion 1224 will be outside the user's viewing area and although the lateral dimensions of portions 1222 and 1224 are illustrated as similar in FIG. 12, this is not required by the present invention and portion 1224 can have a lateral size a fraction of the lateral size of portion 1222. Thus, portion 1224 is provided to enable mechanical mounting of second optical element 1220 to eyepiece waveguide 1230 without impacting the clear field associated with the user's viewing area. Although portion 1224 is illustrated as planar in this design, this is not required by the present invention and portion 1224 may include indentions and/or protrusions used for mechanical alignment, or the like. One of ordinary skill in the art would recognize many variations, modifications, and alternatives.

Referring once again to FIG. 12, dimensions of the various elements of VOA 1200 are illustrated. As illustrated in FIG. 12, the spacing D between the optical elements and the eyepiece waveguide can be on the order of tens of microns, for example, from ~100 µm to ~1 µm, thereby providing a very small gap while still providing for an air gap between the eyepiece waveguide and the cover plates with optical power. As will be evident to one of skill in the art, preservation of the air gap enables light to propagate by total internal reflection (TIR) inside the waveguide layers. A variety of techniques can be utilized to maintain the spacing D between the optical elements and the eyepiece waveguide, including adhesive, micro-spheres, or other suitable spacers, adhesive tapes with a predetermined thickness, or the like. Utilizing the cover plates with optical power, which can have a thickness (measured along the longitudinal dimension) less than 1 mm, for example, ~600 µm, and an eyepiece waveguide with a thickness on the order of 2 mm, the total thickness of the VOA can be on the order of 3 mm, which is about half of the thickness of VOAs fabricated using conventional designs.

Figure 13A:
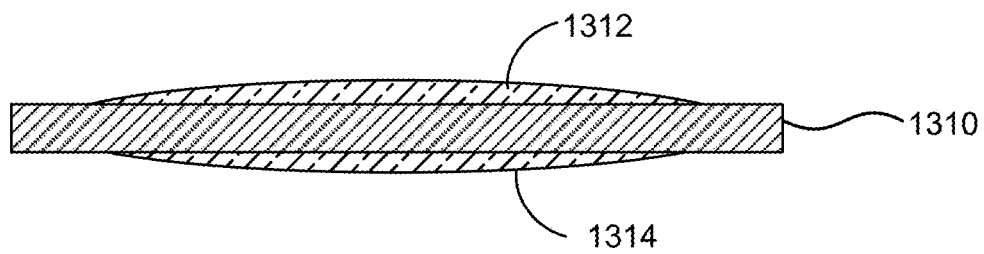
FIG. 13A is a simplified cross-sectional diagram illustrating a bi-convex laminated lens according to an embodiment of the present invention.

FIG. 13A is a simplified cross-sectional diagram illustrating a bi-convex laminated lens according to an embodiment of the present invention. As illustrated in FIG. 13A, cover plate 1310 provides mechanical support to molded film 1312 on a first side of the cover plate and molded film 1314 on the opposing side of the cover plate. Thus, in addition to plano-concave laminated lenses as illustrated in FIG. 3C, embodiments of the present invention can be utilized to fabricate bi-convex laminated lenses. It should be noted that in addition to bi-convex laminated lenses, bi-concave laminated lenses can be provided by forming concave molded films on cover plate 1310.

Figure 13B:
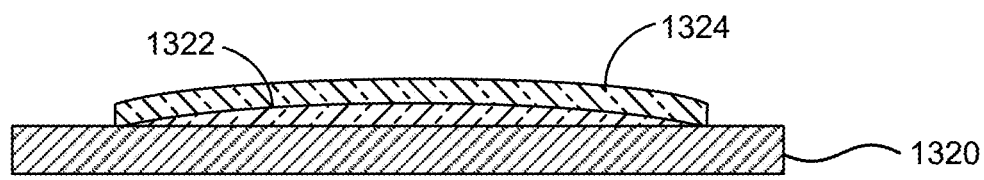
FIG. 13B is a simplified cross-sectional diagram illustrating a convex meniscus lens according to an embodiment of the present invention.

FIG. 13B is a simplified cross-sectional diagram illustrating a convex meniscus lens according to an embodiment of the present invention. As illustrated in FIG. 13B, cover plate 1320 provides mechanical support to molded film 1322 on the first side of the cover plate as well as molded film 1324 overlying molded film 1322. By utilizing two different molded films with different indices of refraction, a convex meniscus lens is formed in a laminated lens format. The materials and thickness of molded films 1322 and 1324 can be selected depending on the particular applications. It should be noted that in addition to a convex meniscus lens in a laminated lens format, a concave meniscus lens can be provided by forming concave molded films on cover plate 1320.

Figure 13C:
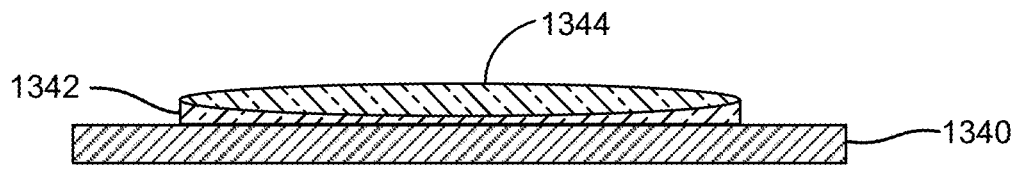
FIG. 13C is a simplified cross-sectional diagram illustrating an achromatic laminated lens according to an embodiment of the present invention.

FIG. 13C is a simplified cross-sectional diagram illustrating an achromatic laminated lens according to an embodiment of the present invention. As illustrated in FIG. 13C, cover plate 1340 provides mechanical support to molded film 1342 on the first side of the cover plate as well as molded film 1344 overlying molded film 1342. In this embodiment, molded film 1342 is a low index of refraction material and molded film 1344 is a high index of refraction material (in comparison to molded film 1342), thereby forming an achromatic lens. Thus, by utilizing two different molded films with different indices of refraction, an achromatic lens is formed in a laminated lens format. The materials and thickness of molded films 1342 and 1344 can be selected depending on the particular applications. It should be noted that in addition to a convex achromatic lens in a laminated lens format, a concave achromatic lens can be provided by forming concave molded films on cover plate 1340.

Figure 13D:
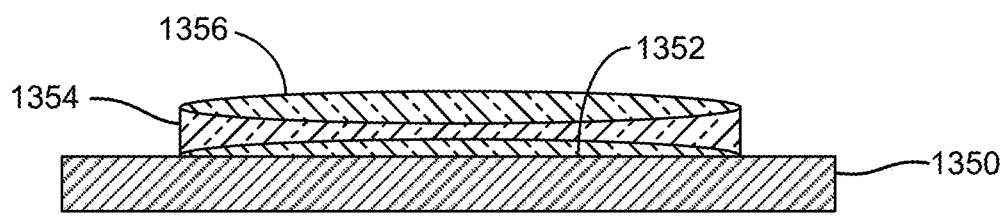
FIG. 13D is a simplified cross-sectional diagram illustrating an apochromatic laminated lens according to an embodiment of the present invention.

FIG. 13D is a simplified cross-sectional diagram illustrating an apochromatic laminated lens according to an embodiment of the present invention. As illustrated in FIG. 13D, cover plate 1350 provides mechanical support to molded film 1352 on the first side of the cover plate, molded film 1354 overlying molded film 1352, and molded film 1356 overlying molded film 1354. In this embodiment, molded film 1354 is a low index of refraction material in comparison to molded film 1352 and molded film 1356, thereby forming a triplet. Thus, by utilizing three different molded films with higher index of refraction molded films on either side of a molded film with a lower index of refraction, an apochromatic lens is formed in a laminated lens format. The materials and thickness of molded films 1352, 1354, and 1356 can be selected depending on the particular applications. It should be noted that in addition to a convex apochromatic lens in a laminated lens format, a concave apochromatic lens can be provided by forming concave molded films on cover plate 1350.

Figure 14A:
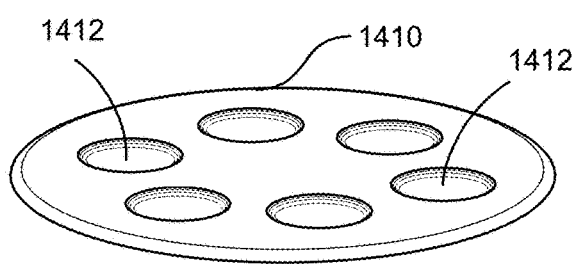
FIG. 14A is a simplified perspective diagram illustrating a first mold according to an embodiment of the present invention.

FIG. 14A is a simplified perspective diagram illustrating a first mold according to an embodiment of the present invention. As illustrated in FIG. 14A, first mold 1410 is a multi-lens mold and is suitable for use in fabricating a plurality of lenses concurrently or simultaneously. It should be appreciated that the other molds described herein can be implemented as multi-lens molds and illustrations showing the fabrication of a single lens using a single lens mold are merely provided for ease of illustration and are not intended to limit embodiments of the present invention. In other embodiments, first mold 1410 is implemented as a single lens mold. One of ordinary skill in the art would recognize many variations, modifications, and alternatives. As illustrated in FIG. 14A, first mold 1410 includes a plurality of plano-concave recesses 1412 distributed across the surface of first mold 1410. Although plano-concave recesses 1412 are illustrated in FIG. 14A, embodiments of the present invention are not limited to this particular optical format and convex features could be formed on the top surface of first mold 1410 in other embodiments. Moreover, a combination of one or more plano-concave recesses and one or more convex features could be implemented using first mold 1410 as appropriate to the particular application.

A variety of materials can be utilized in first mold 1410, including glass, plastic, metal, or the like. Suitable materials that are characterized by mechanical rigidity and resistance to degradation by UV radiation can be utilized, including combinations of materials.

Figure 14B:
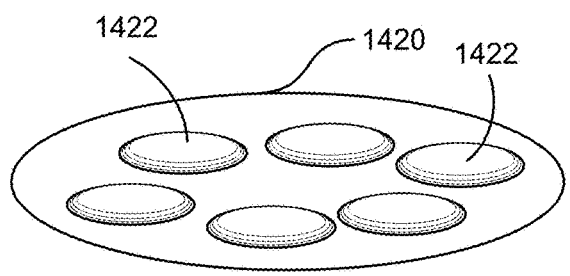
FIG. 14B is a simplified perspective diagram illustrating a first molding according to an embodiment of the present invention.

FIG. 14B is a simplified perspective diagram illustrating a first molding according to an embodiment of the present invention. First molding 1420 illustrated in FIG. 14B is formed by processes similar to those discussed in relation to FIGS. 2A-2C, but utilizing concave first mold 1410 rather than the convex mold discussed in relation to FIGS. 2A-2C. Accordingly, first molding 1420 is formed using a castable material or curable resin that is deposited in unreacted or semi-reacted form into first mold 1410, brought into proximity with a substrate (not shown) to form the desired lens shape, and UV cured to form first molding 1420.

First molding 1420 can be utilized as plano-convex lens as described herein, for example, in a viewing optics assembly, or can be utilized as a flexible mold suitable for use as a mold during molding of additional moldings. This latter use is illustrated in relation to FIG. 14D.

As illustrated in FIG. 14B, first molding 1420 has plano-convex features 1422 that substantially match plano-concave recesses 1412 shown in FIG. 14A. As discussed above, mechanical and volumetric material shrinkage of the casted material can occur during UV curing, however, this mechanical shrinkage is predictable and can be accounted for during the lens design process, with the curvature of plano-convex features 1422 being modified with respect to the curvature of plano-concave recesses 1412 as a result of the mechanical and volumetric material shrinkage. Accordingly, plano-convex features 1422 will be characterized by the desired curvature after molding and mechanical and volumetric shrinkage has occurred.

Figure 14C:
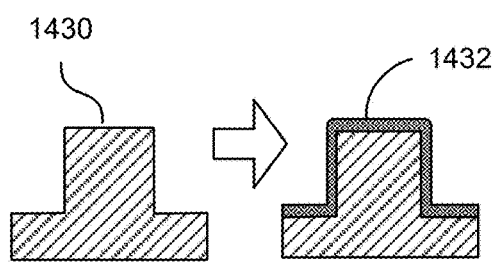
FIG. 14C is a simplified side view of a portion of a molding before and after a release layer coating process according to an embodiment of the present invention.

FIG. 14C is a simplified side view of a portion of a molding before and after a release layer coating process according to an embodiment of the present invention. The release layer coating process illustrated in FIG. 14C is suitable for use in forming anti-stiction coatings as described more fully throughout the present specification. Referring to FIG. 14C, a molding 1430 is provided and a deposition process is utilized to form anti-stiction coating 1432, also referred to as a release layer coating, on molding 1430. Referring to FIG. 14B, an anti-stiction coating can be deposited on first molding 1420 to form a plurality of convex features coated with the anti-stiction coating, which enable subsequent materials to be released after use of the coated molding as a mold.

Anti-stiction coating 1432 can be fabricated using an inorganic layer such as an oxide or a nitride, for example, silicon dioxide, silicon nitride, or other dielectrics, for instance, deposited using an Atmospheric Pressure Plasma Enhanced Chemical Vapor Deposition (APPECVD) process. Additionally, anti-stiction coating 1432 can be fabricated using a metal layer or other organic Fluoropolymer or Silane based polymeric materials that are suitable as a de-molding surface. Organic treatment processes can be used including fluorinated surface release chemical treatment, for example, using trichloro (1H, 1H, 2H, 2H-perfluorooctyl) silane, or the like. The inorganic coating material can include, but is not limited to, $SiO_2$, SiC, $Al_2O_3$, $Si_3N_4$, TiN, Cr, Ag, Au, Al, Cu, Ir, Pt, Pd, etc. Semiconductor based processing such as CVD or PVD processes like Plasma enhanced Low pressure CVD, Atomic Layer Deposition, Physical Vapor Deposition, Evaporation, Sputter, etc., can be used to deposit such anti-stiction coatings. Coating methods such as Spraying (atomization), inkjetting, knife edge coating, low pressure or atmospheric vapor coating can be used to coat Fluoropolymer, Siloxane (silicone), or other polymer based coatings.

The thickness of anti-stiction coating 1432 can be on the order of a few nanometers, for example, 1 nm, 2 nm, 3 nm or the like, or it can also be tens of nanometers, for example, 10 nm, nm, 30 nm, or the like, or it can be a few hundred nanometers, for example, 100 nm, 200 nm, 300 nm or the like, that is thicknesses that are thick enough to prevent pinholes and provide mold release, but thin enough to not impact the radius of curvature of the molded film that is produced.

Figure 14D:
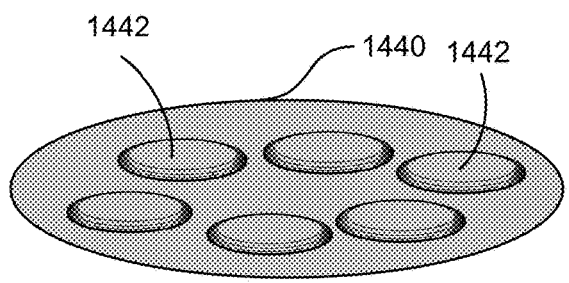
FIG. 14D is a perspective diagram illustrating a coated first molding according to an embodiment of the present invention.

FIG. 14D is a perspective diagram illustrating a coated first molding according to an embodiment of the present invention. Thus, the materials and processes discussed in relation to FIG. 14C have been used to coat first molding 1420, resulting in the fabrication of coated first molding 1440. Coated first molding 1440 can be utilized as a mold, for example, a flexible mold, and can be referred to as first child mold since the mold features are based on the mold features present on first mold 1410. As illustrated in FIG. 14D, coated first molding 1440 has plano-convex features 1442 that substantially match plano-convex features 1422 shown in FIG. 14B and are coated with an anti-stiction or release layer coating.

Figure 14E:
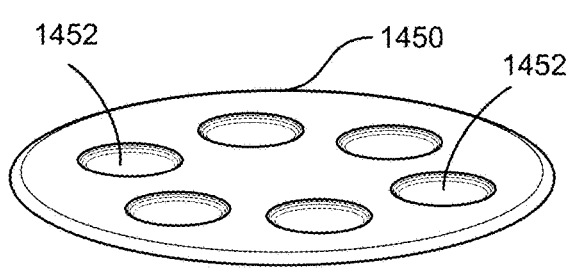
FIG. 14E is a simplified perspective diagram illustrating a second molding according to an embodiment of the present invention.

FIG. 14E is a simplified perspective diagram illustrating a second molding according to an embodiment of the present invention. Second molding 1450 is fabricated in a manner similar to that discussed with respect to first molding 1420 illustrated in FIG. 14B. Thus, second molding 1450 illustrated in FIG. 14E is formed using a castable material or curable resin that is deposited in unreacted or semi-reacted form on a substrate (not shown), brought into proximity with coated first molding 1440 to form the desired lens shape, and UV cured in a manner similar to that illustrated in FIGS. 2A-2C to form second molding 1450. The presence of the anti-stiction coating on coated first molding 1440 enables second molding 1450 to be detached from coated first molding 1440 after fabrication.

Second molding 1450 can be utilized as plano-concave lens as described herein, for example, in a viewing optics assembly, or can be utilized as a flexible mold suitable for use as a mold during molding of additional moldings. This latter use is illustrated in relation to FIG. 14F.

As discussed above in relation to the curvature of plano-convex features 1422, second molding 1450 has plano-concave recesses 1452 that substantially match plano-convex features 1442 shown in FIG. 14D. As discussed above, mechanical and volumetric material shrinkage of the casted material can occur during UV curing, however, this mechanical shrinkage is predictable and can be accounted for during the lens design process, with the curvature of plano-concave recesses 1452 being modified with respect to the curvature of plano-convex features 1442 as a result of the mechanical and volumetric material shrinkage. Accordingly, plano-concave recesses 1452 will be characterized by the desired curvature after molding and mechanical and volumetric shrinkage has occurred.

Considering FIGS. 14B and 14E, two sets of complementary moldings are provided by embodiments of the present invention that have optical elements that can be used as positive or negative lenses, respectively. The surface features associated with the surfaces of the moldings can be controlled to provide spherical or aspherical lenses of predetermined curvature. Moreover, each of these complementary moldings can be utilized to fabricate additional molds as discussed in relation to FIG. 14D above or FIG. 14F below.

Figure 14F:
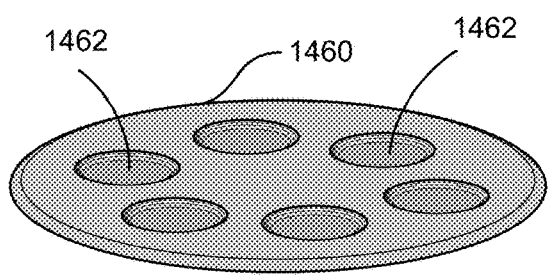
FIG. 14F is a perspective diagram illustrating a coated second molding according to an embodiment of the present invention.

FIG. 14F is a perspective diagram illustrating a coated second molding according to an embodiment of the present invention. Referring to FIG. 14F, the materials and processes discussed in relation to FIG. 14C have been used to coat second molding 1450, resulting in the fabrication of coated second molding 1460. Coated second molding 1460 can be utilized as a mold, for example, a flexible mold, and can be referred to as second child mold since the mold features are based on the mold features present on second molding 1450. As illustrated in FIG. 14F, coated second molding 1460 has plano-concave features 1462 that substantially match plano-concave features 1452 shown in FIG. 14E and are coated with an anti-stiction or release layer coating.

Considering FIGS. 14D and 14F, two complementary molds, i.e., coated moldings, are provided by embodiments of the present invention that have mold features that can be used during fabrication of negative or positive lenses, respectively. The surface features associated with the surfaces of the molds can be controlled to provide molds for spherical or aspherical lenses of predetermined curvature. Effectively replicating the surface features characterizing first mold 1410, given the mechanical and volumetric material shrinkage accompanying the fabrication of coated first molding 1430 and coated second molding 1460, the two complementary molds of opposite curvature features can be utilized during fabrication of lenses, thereby extending the life of first mold 1410.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of fabricating an optical element, the method comprising:
   providing a substrate comprising a planar surface and a raised portion extending from the planar surface along a perimeter of the substrate;
   forming a castable material coupled to the substrate;
   casting the castable material using a mold;
   curing the castable material; and
   removing the mold;
   wherein the optical element comprises a planar region and a clear aperture adjacent the planar region and characterized by an optical power.

2. The method of claim 1 wherein the substrate comprises a cover glass.

3. The method of claim 2 wherein the cover glass is planar.

4. The method of claim 1 wherein the substrate comprises a planar polymer structure.

5. The method of claim 1 wherein the castable material comprises a UV cured resin.

6. The method of claim 1 wherein the mold comprises an anti-stiction coating.

7. The method of claim 6 wherein the anti-stiction coating is hydrophobic.

8. The method of claim 6 wherein the anti-stiction coating comprises silicon oxide or silicon nitride.

9. The method of claim 1 wherein casting the castable material comprises forming nano-features in the castable material.

10. The method of claim 9 wherein the nano-features are diffractive features that reduce reflection at an interface of the castable material.

11. A method of fabricating an optical element, the method comprising:
    providing a mold set having mold plates;
    placing a moldable material between the mold plates;
    joining the mold plates;
    curing the moldable material to form the optical element; and
    removing the optical element from the mold set;
    wherein the optical element comprises a planar region and a clear aperture adjacent the planar region and characterized by an optical power.

12. The method of claim 11 wherein the optical power is negative.

13. The method of claim 11 wherein the optical power is positive.

14. The method of claim 11 wherein one of the mold plates is characterized by a planar surface.

15. The method of claim 11 wherein the moldable material comprises a UV curable resin.

16. The method of claim 11 wherein at least one of the mold plates comprises nano-features.

17. The method of claim 16 wherein the nano-features are diffractive features that reduce reflection at an interface of the moldable material.

18. The method of claim 11 wherein the mold comprises an anti-stiction coating.

19. The method of claim 18 wherein the anti-stiction coating is hydrophobic.

20. The method of claim 18 wherein the anti-stiction coating comprises silicon oxide or silicon nitride.

* * * * *